United States Patent
Niess et al.

(10) Patent No.: US 11,902,228 B1
(45) Date of Patent: Feb. 13, 2024

(54) INTERACTIVE USER STATUS

(71) Applicant: Salesforce, Inc., San Francisco, CA (US)

(72) Inventors: Anna Niess, Hastings-on-Hudson, NY (US); Noah Weiss, Austin, TX (US); Kevin Marshall, Mill Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/092,039

(22) Filed: Dec. 30, 2022

(51) Int. Cl.
| | |
|---|---|
| *H04L 51/046* | (2022.01) |
| *G06F 3/04817* | (2022.01) |
| *G06F 3/04842* | (2022.01) |
| *H04L 51/043* | (2022.01) |

(52) U.S. Cl.
CPC ........ *H04L 51/046* (2013.01); *G06F 3/04817* (2013.01); *G06F 3/04842* (2013.01); *H04L 51/043* (2013.01)

(58) Field of Classification Search
CPC .................................................. H04L 51/046
See application file for complete search history.

(56) References Cited

U.S. PATENT DOCUMENTS

| | | |
|---|---|---|
| 8,892,446 B2 | 11/2014 | Cheyer et al. |
| 9,940,394 B1 | 4/2018 | Grant et al. |
| 10,229,204 B1 | 3/2019 | Grant et al. |
| 10,229,205 B1 | 3/2019 | Grant et al. |
| 10,698,706 B1 | 6/2020 | Rabe et al. |
| 10,805,386 B2 | 10/2020 | Bourassa-Denis et al. |
| 10,846,349 B1 | 11/2020 | Grant et al. |
| 10,951,564 B1 | 3/2021 | Delp et al. |
| 11,140,203 B1 | 10/2021 | Butterfield et al. |
| 11,166,126 B2 | 11/2021 | Greene et al. |
| 11,178,088 B1 | 11/2021 | Weiss et al. |
| D938,483 S | 12/2021 | Niess |
| 11,223,590 B2 | 1/2022 | Delp et al. |
| 11,252,537 B2 | 2/2022 | DeLanghe et al. |
| 11,272,326 B2 | 3/2022 | Baez et al. |
| D950,603 S | 5/2022 | Niess |
| D955,407 S | 6/2022 | Niess |
| D956,085 S | 6/2022 | Niess |
| 11,481,236 B1 | 10/2022 | Weiss et al. |

(Continued)

FOREIGN PATENT DOCUMENTS

| | | |
|---|---|---|
| AU | 2021105632 B4 | 12/2021 |
| EP | 3884417 A1 | 9/2021 |
| WO | 2022076011 A1 | 4/2022 |

OTHER PUBLICATIONS

PCT Patent Application PCT/US2023/021928 International Search Report and Written Opinion of the International Searching Authority dated Aug. 30, 2023.

(Continued)

*Primary Examiner* — Roland J Casillas
(74) *Attorney, Agent, or Firm* — Lee & Hayes, P.C.

(57) ABSTRACT

Media, methods, and systems of presenting and assigning interactive user statuses within a group-based communication system. The interactive user statuses may include links to resources and/or actuatable controls for accessing collaboration activities with other users. The interactive user statuses may be assigned manually or automatically based on user activity within the group-based communication system or within external applications.

20 Claims, 20 Drawing Sheets

(56) References Cited

U.S. PATENT DOCUMENTS

| | | |
|---|---|---|
| 11,531,645 B2 | 12/2022 | Liszka et al. |
| D975,729 S | 1/2023 | Niess |
| 11,582,178 B2 | 2/2023 | Delp et al. |
| 2013/0154958 A1 | 6/2013 | Clavin et al. |
| 2015/0264023 A1 | 9/2015 | Reno |
| 2019/0184234 A1* | 6/2019 | Packles .............. A63B 24/0087 |
| 2019/0188278 A1 | 6/2019 | Liszka et al. |
| 2019/0342519 A1* | 11/2019 | Van Os ................. H04N 21/47 |
| 2020/0036548 A1 | 1/2020 | DeLanghe et al. |
| 2020/0169518 A1 | 5/2020 | DeLanghe et al. |
| 2020/0169559 A1 | 5/2020 | Jones et al. |
| 2020/0410583 A1 | 12/2020 | Hart et al. |
| 2021/0026903 A1 | 1/2021 | Grant et al. |
| 2021/0118325 A1 | 4/2021 | Gupta et al. |
| 2021/0149688 A1 | 5/2021 | Newell et al. |
| 2021/0182087 A1 | 6/2021 | Park et al. |
| 2021/0243572 A1 | 8/2021 | Baez et al. |
| 2021/0365806 A1 | 11/2021 | Sumanth et al. |
| 2021/0385099 A1 | 12/2021 | DeLanghe et al. |
| 2022/0109645 A1* | 4/2022 | Delp ..................... H04L 63/108 |
| 2022/0109650 A1 | 4/2022 | Weiss et al. |
| 2022/0109706 A1 | 4/2022 | Butterfield et al. |
| 2022/0109707 A1* | 4/2022 | Butterfield ............ H04L 65/403 |
| 2022/0124464 A1 | 4/2022 | Greene et al. |
| 2022/0147197 A1 | 5/2022 | Tross et al. |
| 2022/0210104 A1 | 6/2022 | Delp et al. |
| 2022/0345426 A1 | 10/2022 | Demmer et al. |
| 2022/0365793 A1* | 11/2022 | Weiss ..................... G06F 9/451 |
| 2022/0368660 A1* | 11/2022 | Niess ................. H04L 12/1818 |
| 2022/0408225 A1 | 12/2022 | DeLanghe et al. |
| 2023/0018239 A1 | 1/2023 | Weiss et al. |

OTHER PUBLICATIONS

U.S. Appl. No. 18/071,350, Non-Final Office Action dated Jul. 18, 2023.

* cited by examiner

US 11,902,228 B1

INTERACTIVE USER STATUS

TECHNICAL FIELD

Aspects of the present disclosure generally relate to user statuses. More specifically, aspects of the present disclosure relate to interactive user statuses within a group-based communication system.

BACKGROUND

A user status in a group-based communication system typically includes a symbol or text used to communicate information relating to a user and/or an activity that the user is currently participating in. For example, a user may set a status indicator indicating that they are out-of-office or on vacation. However, said user statuses are not interactive and fail to provide any functionality beyond communicating an activity of the user. Thus, it is difficult to provide smooth navigation to other users viewing the user status to collaborate or otherwise interact with the user. As such, said user statuses fail to provide the serendipitous communication that is available in a physical workspace.

BRIEF DESCRIPTION OF THE FIGURES

Aspects of the present disclosure are described in detail below with reference to the attached drawing figures, wherein.

Figure 1:
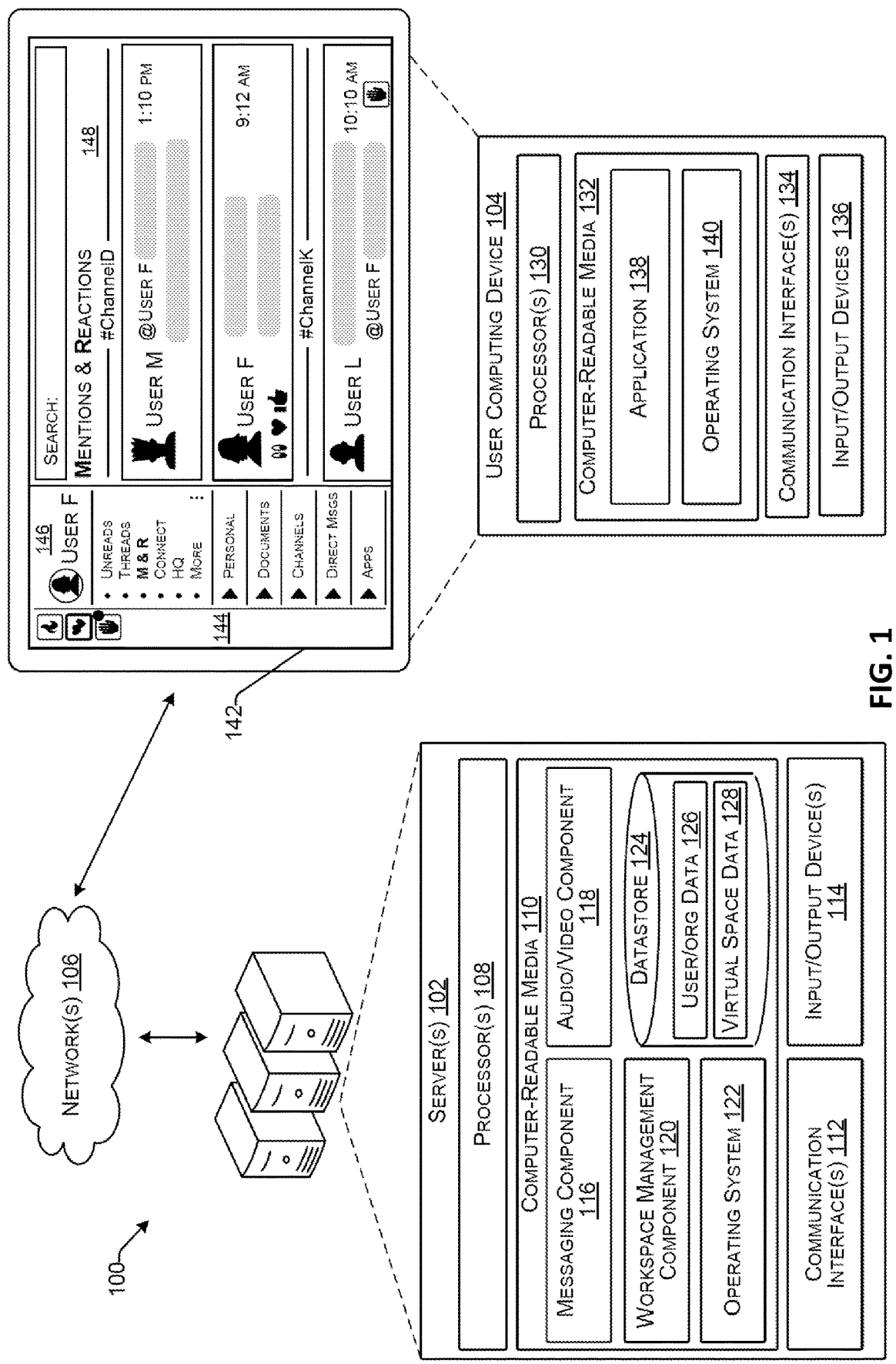
FIG. 1 illustrates an exemplary environment for certain aspects of the disclosure.

The drawing figures do not limit the present disclosure to the specific aspects disclosed and described herein. The drawings are not necessarily to scale, emphasis instead being placed upon clearly illustrating the principles of the present disclosure.

DETAILED DESCRIPTION

The following detailed description of aspects of the present disclosure references the accompanying drawings that illustrate specific aspects in which the present disclosure can be practiced. The aspects are intended to describe aspects of the present disclosure in sufficient detail to enable those skilled in the art to practice the present disclosure. Other aspects can be utilized, and changes can be made without departing from the scope of the present disclosure. The following detailed description is, therefore, not to be taken in a limiting sense. The scope of aspects of the present disclosure is defined only by the appended claims, along with the full scope of equivalents to which such claims are entitled.

In this description, references to "one aspect," "an aspect," or "aspects" mean that the feature or features being referred to are included in at least one aspect of the technology. Separate reference to "one aspect," "an aspect," or "aspects" in this description do not necessarily refer to the same aspect and are also not mutually exclusive unless so stated and/or except as will be readily apparent to those skilled in the art from the description. For example, a feature, structure, or act described in one aspect may also be included in other aspects but is not necessarily included. Thus, the technology can include a variety of combinations and/or integrations of the aspects described herein.

Group-Based Communication System

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with the same organization. In some examples, members of a group, and thus workspace, can be associated with different organizations (e.g., entities with different organization identifiers).

In at least one example, the example environment 100 can include one or more instances of server computing devices 102 (or "server(s)"). In at least one example, the server computing device 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server computing device 102 can communicate with a user computing device 104 via one or more network(s) 106. That is, the server computing device 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single instance of user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server computing device 102 can include one or more processors 108, computer-readable media 110, one or more communication interfaces 112, and input/output devices 114.

In at least one example, each processor of the one or more processors 108 can be a single processing unit or multiple processing units and can include single or multiple computing units or multiple processing cores. The one or more processors 108 can be implemented as one or more microprocessors, microcomputers, microcontrollers, digital signal processors, central processing units (CPUs), graphics processing units (CPUs), state machines, logic circuitries, and/or any devices that manipulate signals based on operational instructions. For example, the one or more processors 108 can be one or more hardware processors and/or logic circuits of any suitable type specifically programmed or configured to execute the algorithms and processes described herein. The one or more processors 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Examples of computer-readable media 110 can include, but are not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server computing device 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the one or more processors 108. In many implementations, these functional components comprise instructions or programs that are executable by the one or more processors 108 and that, when executed, specifically configure the one or more processors 108 to perform the actions attributed above to the server computing device 102, such as performing the methods described below. Functional components stored in the computer-readable media can optionally include a messaging component 116, an audio/video component 118, a workspace management component 120, an operating system 122, and a datastore 124.

In at least one example, the messaging component 116 can process messages between users. That is, in at least one example, the messaging component 116 can receive an outgoing message from a first instance of user computing device 104 and can send the message as an incoming message to a second instance of user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space. In at least one example, the canvas can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such a collaborative document, can be presented via a user interface. In addition, metadata associated with each message transmitted via the virtual space, such as a timestamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective instances of user computing device 104. In various examples, the messaging component 116 can identify the message as an update to the virtual space and, based on the identified update, can cause a notification associated with the update to be presented in association with a sidebar of the user interface associated with one or more of the users associated with the virtual space. For example, the messaging component 116 can receive, from a first user account, a message transmitted in association with a virtual space. In response to receiving the message (e.g., interaction data associated with an interaction of a first user with the virtual space), the messaging component 116 can identify a second user associated with the virtual space (e.g., another user that is a member of the virtual space). In some examples, the messaging component 116 can cause a notification of an update to the virtual space to be presented via a sidebar of a user interface associated with a second user account of the second user. In some examples, the messaging component 116 can cause the notification to be presented in response to a determination that the sidebar of the user interface associated with the second user account includes an affordance associated with the virtual space. In such examples, the notification can be presented in association with the affordance associated with the virtual space.

In various examples, the messaging component 116 can be configured to identify a mention or tag associated with the message transmitted in association with the virtual space. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the virtual space in a sidebar of a user interface associated with the particular user and/or in a virtual space associated with mentions and reactions. That is, the messaging component 116 can be configured to alert a particular user that they were mentioned in a virtual space.

In at least one example, the audio/video component 118 can be configured to manage audio and/or video communications between and among users. In some examples, the audio and/or video communications can be associated with an audio and/or video conversation. In at least one example, the audio and/or video conversation can include a discrete identifier configured to uniquely identify the audio and/or video conversation. In some examples, the audio and/or video component 118 can store user identifiers associated with user accounts of members of a particular audio and/or video conversation, such as to identify user(s) with appropriate permissions to access the particular audio and/or video conversation.

In some examples, communications associated with an audio and/or video conversation ("conversation") can be synchronous and/or asynchronous. That is, the conversation can include a real-time audio and/or video conversation between a first user and a second user during a period of time and, after the first period of time, a third user who is associated with (e.g., is a member of) the conversation can contribute to the conversation. The audio/video component 118 can be configured to store audio and/or video data associated with the conversation, such as to enable users with appropriate permissions to listen and/or view the audio and/or video data.

In some examples, the audio/video component 118 can be configured to generate a transcript of the conversation and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the conversation. That is, in some examples, the audio/video component 118 can be configured to generate a textual representation of the conversation while it is being conducted. In some examples, the audio/video component 118 can generate the transcript after receiving an indication that the conversation is complete. The indication that the conversation is complete can include an indication that a host or administrator associated therewith has stopped the conversation, that a threshold number of meeting attendees have closed associated interfaces, and/or the like. That is, the audio/video component 118 can identify a completion of the conversation and, based on the completion, can generate the transcript associated therewith.

In at least one example, the audio/video component 118 can be configured to cause presentation of the transcript in association with a virtual space with which the audio and/or video conversation is associated. For example, a first user can initiate an audio and/or video conversation in association with a communication channel. The audio/video component 118 can process audio and/or video data between attendees of the audio and/or video conversation and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the conversation. In some examples, the audio/video component 118 can update the transcript based on the comments.

In at least one example, the audio/video component 118 can manage one or more audio and/or video conversations in association with a virtual space associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server computing device 102, to transmit communications in association with other virtual spaces that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more audio and/or video conversations managed by the audio/video component 118. That is, the audio and/or video conversations associated with the virtual headquarters can be further associated with, or independent of, one or more other virtual spaces of the virtual headquarters.

In at least one example, the workspace management component 120 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 120 can manage workspace membership. That is, the workspace management component 120 can receive requests to associate users with individual workspaces and the workspace management component 120 can associate user accounts associated with such users with group identifiers associated with the individual workspaces. For example, responsive to receiving a request to add a user to a workspace, the workspace management component 120 can associate a user account of the user with a group identifier of the workspace. The workspace management component 120 can disassociate user accounts and group identifiers, for example, when a user is removed from a workspace.

In at least one example, the workspace management component 120 can manage cross-workspace data integration, as described herein. For example, the workspace management component 120 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 120 can detect updates to data associated with a workspace and can integrate such updated data into user interface(s) presented via user computing device(s) of user(s) associated with the workspace. Similarly, the workspace management component 120 can facilitate cross-workspace operations. For example, the workspace management component 120 can facilitate messages between workspaces, searches between or across multiple workspaces, and the like. Additional details of operations that can be performed by the workspace management component 120 are described below.

In at least one example, the operating system 122 can manage the one or more processors 108, computer-readable media 110, hardware, software, etc. of the server computing device 102.

In at least one example, the datastore 124 can be configured to store data that is accessible, manageable, and updatable. In some examples, the datastore 124 can be integrated with the server computing device 102, as shown in FIG. 1. In other examples, the datastore 124 can be located remotely from the server computing device 102 and can be accessible to the server computing device 102 and/or user device(s), such as the user computing device 104. The datastore 124 can comprise multiple databases, which can include user/org data 126 and/or virtual space data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j_doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In at least one example, the virtual space data 128 can include data associated with one or more virtual spaces associated with the communication platform. The virtual space data 128 can include textual data, audio data, video data, images, files, and/or any other type of data configured to be transmitted in association with a virtual space. Non-limiting examples of virtual spaces include workspaces, communication channels, direct messaging instances, collaborative documents, canvases, and audio and/or video conversations. In at least one example, the virtual space data can store data associated with individual virtual spaces separately, such as based on a discrete identifier associated with each virtual space. In some examples, a first virtual space can be associated with a second virtual space. In such examples, first virtual space data associated with the first virtual space can be stored in association with the second virtual space. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each virtual space of the communication platform can be assigned a discrete identifier that uniquely identifies the virtual space. In some examples, the virtual space identifier associated with the virtual space can include a physical address in the virtual space data 128 where data related to that virtual space is stored. A virtual space may be "public," which may allow any user within an organization (e.g., associated with an organization identifier) to join and participate in the data sharing through the virtual space, or a virtual space may be "private," which may restrict data communications in the virtual space to certain users or users having appropriate permissions to view. In some examples, a virtual space may be "shared," which may allow users associated with different organizations (e.g., entities associated with different organization identifiers) to join and participate in the data sharing through the virtual space. Shared virtual spaces (e.g., shared channels) may be public such that they are accessible to any user of either organization, or they may be private such that they are restricted to access by certain users (e.g., users with appropriate permissions) of both organizations.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The one or more communication interfaces 112 can include one or more interfaces and hardware components for enabling communication with various other devices (e.g., the user computing device 104), such as over the network(s) 106 or directly. In some examples, the one or more communication interfaces 112 can facilitate communication via Websockets, Application Programming Interfaces (APIs) (e.g., using API calls), Hypertext Transfer Protocols (HTTPs), etc.

The server computing device 102 can further be equipped with various input/output devices 114 (e.g., I/O devices). Such input/output devices 114 can include a display, various user interface controls (e.g., buttons, joystick, keyboard, mouse, touch screen, etc.), audio speakers, connection ports and so forth.

In at least one example, the user computing device 104 can include one or more processors 130, computer-readable media 132, one or more communication interfaces 134, and input/output devices 136.

In at least one example, each processor of the one or more processors 130 can be a single processing unit or multiple processing units and can include single or multiple computing units or multiple processing cores. The one or more processors 130 can comprise any of the types of processors described above with reference to the one or more processors 108 and may be the same as or different than the one or more processors 108.

The computer-readable media 132 can comprise any of the types of computer-readable media 132 described above with reference to the computer-readable media 110 and may be the same as or different than the computer-readable media 110. Functional components stored in the computer-readable media can optionally include at least one instance of application 138 and an operating system 140.

In at least one example, the application 138 can be a mobile application, a web application, or a desktop application, which can be provided by the communication platform, or which can be an otherwise dedicated application. In some examples, individual user computing devices associated with the environment 100 can have an instance or versioned instance of the application 138, which can be downloaded from an application store, accessible via the Internet, or otherwise executable by the one or more processors 130 to perform operations as described herein. That is, the application 138 can be an access point, enabling the user computing device 104 to interact with the server computing device 102 to access and/or use communication services available via the communication platform. In at least one example, the application 138 can facilitate the exchange of data between and among various other user computing devices, for example via the server computing device 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more virtual spaces, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated. In some examples, the user interface 142 can include a second region 146, or pane, that includes indicator(s) (e.g., user interface element(s), affordance(s), object(s), etc.) representing data associated with the workspace(s) with which the user (e.g., account of the user) is associated. In at least one example, the second region 146 can represent a sidebar of the user interface 142. Additional details associated with the second region 146 and indicator(s) are described below.

In at least one example, the user interface 142 can include a third region 148, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 148 can be associated with the same or different workspaces. That is, in some examples, the third region 148 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 148 presents data associated with multiple workspaces, at least some data can be associated with an indication of which workspace the data is associated with.

In at least one example, the operating system 140 can manage the one or more processors 130, computer-readable media 132, hardware, software, etc. of the server computing device 102.

The one or more communication interfaces 134 can include one or more interfaces and hardware components for enabling communication with various other devices (e.g., the user computing device 104), such as over the network(s) 106 or directly.

In some examples, the one or more communication interfaces 134 can facilitate communication via Websockets, APIs (e.g., using API calls), HTTPs, etc.

The user computing device 104 can further be equipped with various input/output devices 136 (e.g., I/O devices). Such input/output devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the workspace management component 120, and the application 138, techniques described herein can be performed by any other component, or combination of components, which can be associated with the server computing device 102, the user computing device 104, or a combination thereof.

User Interface for a Group-Based Communication System

Figure 2A:
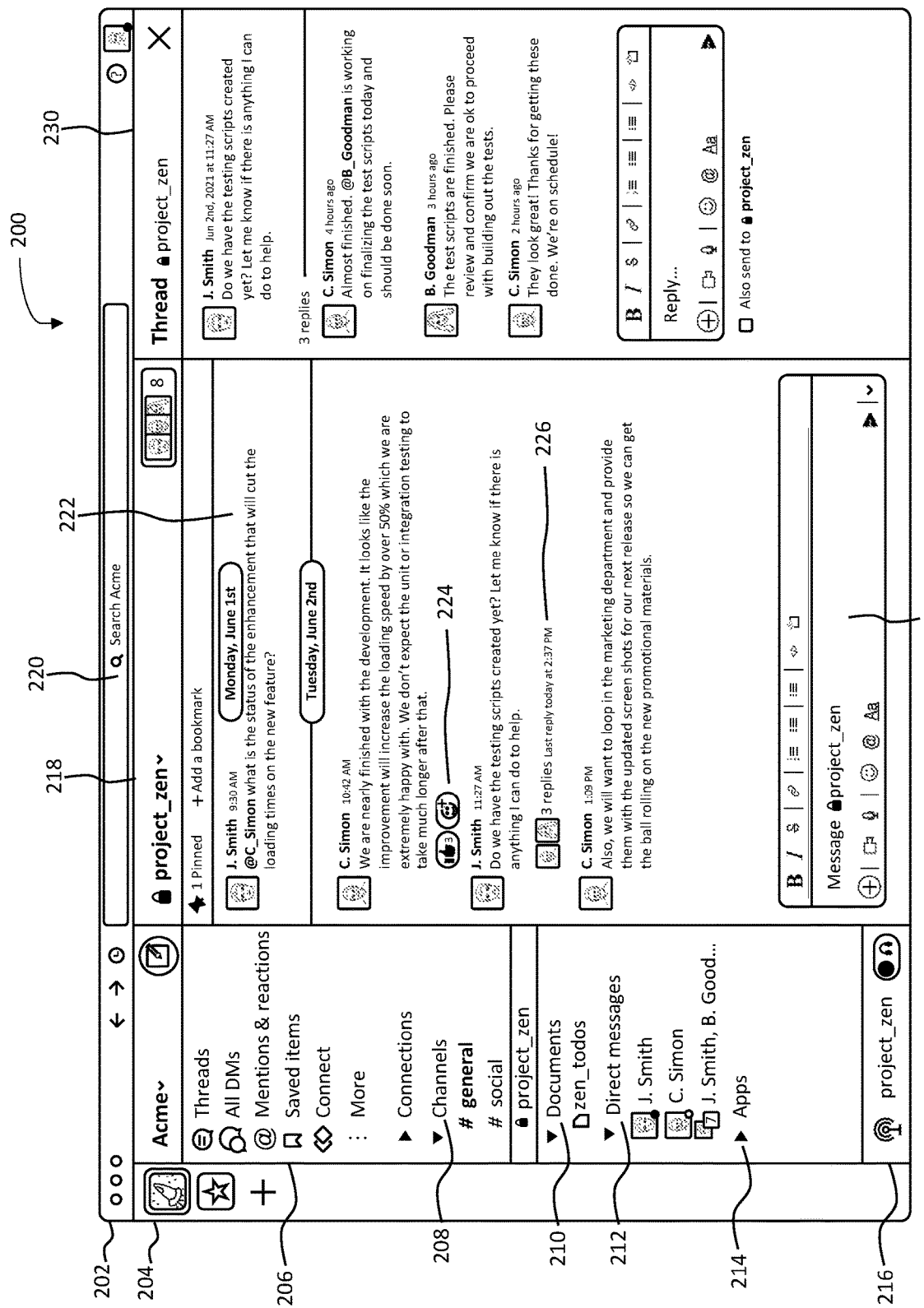
FIG. 2A illustrates a user interface for a group-based communication system for certain aspects of the disclosure.

FIG. 2A illustrates a user interface 200 of a group-based communication system, which will be useful in illustrating the operation of various aspects, as discussed in further detail below. The group-based communication system may include communication data such as messages, queries, files, mentions, users or user profiles, interactions, tickets, channels, applications integrated into one or more channels, conversations, workspaces, or other data generated by or shared between users of the group-based communication system. In some instances, the communication data may comprise data associated with a user, such as a user identifier, channels to which the user has been granted access, groups with which the user is associated, permissions, and other user-specific information.

User interface 200 comprises a plurality of objects such as panes, text entry fields, buttons, messages, or other user interface components that are viewable by a user of the group-based communication system. As depicted, user interface 200 comprises title bar 202, workspace pane 204, navigation pane 206, synchronous multimedia collaboration session pane 216, channel pane 218, and thread pane 230.

In some aspects, title bar 202 comprises search bar 220. Search bar 220 may allow users to search for content located in the current workspace of the group-based communication system, such as files, messages, channels, members, commands, functions, and the like. Users may refine their searches by attributes such as content type, content author, and by users associated with the content. Users may optionally search within specific workspaces, channels, direct message conversations, or documents. In some aspects, title bar 202 comprises navigation commands allowing a user to move backwards and forwards between different panes, as well as to view a history of accessed content. Title bar 202 may comprise additional resources such as links to help documents and user configuration settings.

In some aspects, the group-based communication system can comprise a plurality of distinct workspaces, where each workspace is associated with different groups of users and channels. Each workspace can be associated with a group identifier and one or more user identifiers can be mapped to, or otherwise associated with, the group identifier. Users corresponding to such user identifiers may be referred to as members of the group. In some aspects, user interface 200 comprises workspace pane 204 for navigating between, adding, or deleting various workspaces in the group-based communication system. For example, a user may be a part of a workspace for Acme, where the user is an employee of or otherwise affiliated with Acme. The user may also be a member of a local volunteer organization that also uses the group-based communication system to collaborate. To navigate between the two groups, the user may use workspace pane 204 to change from the Acme workspace to the volunteer organization workspace. A workspace may comprise one or more channels that are unique to that workspace and/or one or more channels that are shared between one or more workspaces. For example, the Acme company may have a workspace for Acme projects, such as Project Zen, a workspace for social discussions, and an additional workspace for general company matters. In some aspects, an organization, such as a particular company, may have a plurality of workspaces, and the user may be associated with one or more workspaces belonging to the organization. In yet other aspects, a particular workspace can be associated with one or more organizations or other entities associated with the group-based communication system.

In some aspects, navigation pane 206 permits users to navigate between virtual spaces such as pages, channels 208, collaborative documents 210 (such as those discussed at FIG. 2D), applications 214, and direct messages 212 within the group-based communication system. For example, navigation pane 206 can include indicators representing virtual spaces that can aggregate data associated with a plurality of virtual spaces of which the user is a member. In at least one example, each virtual space can be associated with an indicator in navigation pane 206. In some examples, an indicator can be associated with an actuation mechanism (e.g., affordance) such that when actuated, can cause user interface 200 to present data associated with the corresponding virtual space. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented, for example in a feed. In such examples, different types of events and/or actions, which can be associated with different virtual spaces, can be presented via the same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with the same type of event and/or action. For example, "threads" can be associated with messages, files, etc. posted in threads to messages posted in a virtual space and "mentions and reactions" can be associated with messages or threads where the user has been mentioned (e.g., via a tag) or another user has reacted (e.g., via an emoji, reaction, or the like) to a message or thread posted by the user. That is, in some examples, the same types of events and/or actions, which can be associated with different virtual spaces, can be presented via the same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented.

In some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or collaborative documents with which the user is associated. In at least one example, a document can include a collaborative document configured to be accessed and/or edited by two or more users with appropriate permissions (e.g., viewing permissions, editing permissions, etc.). In at least one example, if the user requests to access the virtual space associated with one or more documents with which the user is associated, the one or more documents can be presented via user interface 200. In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents. In some examples, the collaborative document can be a virtual space, a board, a canvas, a page, or the like for collaborative communication and/or data organization within the communication platform. In at least one example, the collaborative document can support editable text and/or objects that can be ordered, added, deleted, modified, and/or the like. In some examples, the collaborative document can be associated with permissions defining which users of a communication platform can view and/or edit the document. In some examples, a collaborative document can be associated with a communication channel, and members of the communication channel can view and/or edit the document. In some examples, a collaborative document can be sharable such that data associated with the document is accessible to and/or interactable for members of the multiple communication channels, workspaces, organizations, and/or the like.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be shareable via another virtual space, such that data associated with the canvas is accessible to and/or rendered interactable for members of the virtual space.

Navigation pane 206 may further comprise indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces or, alternatively, may only be associated with one of the workspaces. In some examples, the communication channels represented can be associated with combinations of communication channels associated with a single workspace and communication channels associated with different workspaces.

In some aspects, navigation pane 206 may depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, navigation pane 206 can depict all communication channels, or a subset of all communication channels, that the user is a member of, and the user can interact with user interface 200 to browse or view other communication channels that the user is not a member of but are not currently displayed in navigation pane 206. In some examples, different types of communication channels (e.g., public, private, shared, cross-workspace, etc.) can be in different sections of navigation pane 206, or can have their own sub-regions or sub-panes in the user interface 200. In some examples, communication channels associated with different workspaces can be in different sections of navigation pane 206 or can have their own regions or panes in user interface 200.

In some examples, the indicators can be associated with graphical elements that visually differentiate types of communication channels. For example, project_zen is associated with a lock graphical element. As a non-limiting example, and for the purpose of this discussion, the lock graphical element can indicate that the associated communication channel, project_zen, is private and access thereto is limited, whereas another communication channel, general, is public and access thereto is available to any member of an organization with which the user is associated. In some examples, additional or alternative graphical elements can be used to differentiate between shared communication channels, communication channels associated with different workspaces, communication channels with which the user is or is not a current member, and/or the like.

In at least one example, navigation pane 206 can include indicators representative of communications with individual users or multiple specified users (e.g., instead of all, or a subset of, members of an organization). Such communications can be referred to as "direct messages." Navigation pane 206 can include indicators representative of virtual spaces that are associated with private messages between one or more users.

Direct messages 212 may be communications between a first user and a second user, or they may be multi-person direct messages between a first user and two or more second users. Navigation pane 206 may be sorted and organized into hierarchies or sections depending on the user's preferences. In some aspects, all of the channels to which a user has been granted access may appear in navigation pane 206. In other aspects, the user may choose to hide certain channels or collapse sections containing certain channels. Items in navigation pane 206 may indicate when a new message or update has been received or is currently unread, such as by bolding the text associated with a channel in which an unread message is located or adding an icon or badge (for example, with a count of unread messages) to the channel name. In some aspects, the group-based communication system may additionally or alternatively store permissions data associated with permissions of individual users of the group-based communication system, indicating which channels a user may view or join. Permissions can indicate, for example, which users can communicate directly with other users, which channels a user is permitted to access, restrictions on individual channels, which workspaces the user is permitted to access, and restrictions on individual workspaces.

Additionally, though not illustrated, navigation pane 206 can include a sub-section that is a personalized sub-section associated with a team of which the user is a member. That is, the "team" sub-section can include affordance(s) of one or more virtual spaces that are associated with the team, such as communication channels, collaborative documents, direct messaging instances, audio or video synchronous or asynchronous meetings, and/or the like. In at least one example, the user can associate selected virtual spaces with the team sub-section, such as by dragging and dropping, pinning, or otherwise associating selected virtual spaces with the team sub-section.

Channels within the Group-Based Communication System

In some aspects, the group-based communication system is a channel-based messaging platform, as shown in FIG. 2A. Within the group-based communication system, communication may be organized into channels, each dedicated to a particular topic and a set of users. Channels are generally a virtual space relating to a particular topic comprising messages and files posted by members of the channel.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

The channel discussion may persist for days, months, or years and provide a historical log of user activity. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse on a generally singular topic (e.g., project) without noise from unrelated topics. Because the channels are generally persistent and directed to a particular topic or group, users can quickly and easily refer to previous communications for reference. In some aspects, channel pane 218 may display information related to a channel that a user has selected in navigation pane 206. For example, a user may select the project_zen channel to discuss the ongoing software development efforts for Project Zen. In some aspects, channel pane 218 may include a header comprising information about the channel, such as the channel name, the list of users in the channel, and other channel controls. Users may be able to pin items to the header for later access and to add bookmarks to the header. In some aspects, links to collaborative documents may be included in the header. In further aspects, each channel may have a corresponding virtual space which includes channel-related information such as a channel summary, tasks, bookmarks, pinned documents, and other channel-related links which may be editable by members of the channel.

A communication channel or other virtual space can be associated with data and/or content other than messages, or data and/or content that is associated with messages. For example, non-limiting examples of additional data that can be presented via channel pane 218 of user interface 200 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

Channel pane 218 may include messages such as message 222, which is content posted by a user into the channel. Users may post text, images, videos, audio, or any other file as message 222. In some aspects, particular identifiers (in messages or otherwise) may be denoted by prefixing them with predetermined characters. For example, channels may be prefixed by the "#" character (as in #project_zen) and username may be prefixed by the "@" character (as in @austin_a). Messages such as message 222 may include an indication of which user posted the message and the time at which the message was posted. In some aspects, users may react to messages such as message 222 by selecting reaction button 224. Reaction button 224 allows users to select an icon (sometimes called a reactji in this context), such as a thumbs up, to be associated with the message. Users may respond to messages such as message 222 of another user with a new message such as message 222. In some aspects, such conversations in channels may further be broken out into threads. Threads may be used to aggregate messages related to a particular conversation together to make the conversation easier to follow and reply to, without cluttering the main channel with the discussion. Under the message beginning the thread appears thread reply preview 226. Thread reply preview 226 may show information related to the thread, such as, for example, the number of replies and the members who have replied. Thread replies may appear in thread pane 230 that may be separate from channel pane 218 and may be viewed by other members of the channel by selecting thread reply preview 226 in channel pane 218.

In some aspects, one or both of channel pane 218 and thread pane 230 may include compose pane 228. Compose pane 228 allows users to compose and transmit messages 222 to the members of the channel or to those members of the channel who are following the thread (when the message is sent in a thread). Compose pane 228 may have text editing functions such as bold, strikethrough, and italicize. Compose pane 228 may also allow users to format their messages or attach files such as collaborative documents, images, videos, or any other files to share with other members of the channel. In some aspects, compose pane 228 may enable additional formatting options such as numbered or bulleted lists via either the user interface or an API. Compose pane 228 may also function as a workflow trigger to initiate workflows related to a channel or message. In further aspects, links or documents sent via compose pane 228 may include unfurl instructions related to how the content should be displayed.

Synchronous Multimedia Collaboration Sessions

Figure 2B:
FIG. 2B illustrates a user interface for synchronous multimedia collaboration sessions within the group-based communication system for certain aspects of the disclosure.

FIG. 2B illustrates a synchronous multimedia collaboration session that has been triggered from a channel, as shown in synchronous multimedia collaboration session pane 216. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some aspects, synchronous multimedia collaboration sessions may be based around a particular topic, a particular channel, a particular direct message or multi-person direct message, or a set of users, while in other aspects, synchronous multimedia collaboration sessions may exist without being tied to any channel, topic, or set of users.

Synchronous multimedia collaboration session pane 216 may be associated with a session conducted for a plurality of users in a channel, users in a multi-person direct message conversation, or users in a direct message conversation. Thus, a synchronous multimedia collaboration session may be started for a particular channel, multi-person direct message conversation, or direct message conversation by one or more members of that channel or conversation. Users may start a synchronous multimedia collaboration session in a channel as a means of communicating with other members of that channel who are presently online. For example, a user may have an urgent decision and want immediate verbal feedback from other members of the channel. As another example, a synchronous multimedia collaboration session may be initiated with one or more other users of the group-based communication system through direct messaging. In some aspects, the audience of a synchronous multimedia collaboration session may be determined based on the context in which the synchronous multimedia collaboration session was initiated. For example, starting a synchronous multimedia collaboration session in a channel may automatically invite the entire channel to attend. As another example. Starting a synchronous multimedia collaboration session allows the user to start an immediate audio and/or video conversation with other members of the channel without relying on scheduling or initiating a communication session through a third-party interface. In some aspects, users may be directly invited to attend a synchronous multimedia collaboration session via a message or notification.

Synchronous multimedia collaboration sessions may be short, ephemeral sessions from which no data is persisted. Alternatively, in some aspects, synchronous multimedia collaboration sessions may be recorded, transcribed, and/or summarized for later review. In other aspects, contents of the synchronous multimedia collaboration session may automatically be persisted in a channel associated with the synchronous multimedia collaboration session. Members of a particular synchronous multimedia collaboration session can post messages within a messaging thread associated with that synchronous multimedia collaboration session that are visible to other members of that synchronous multimedia collaboration session together with other messages in that thread.

The multimedia in a synchronous multimedia collaboration session may include collaboration tools such as any or all of audio, video, screen sharing, collaborative document editing, whiteboarding, co-programming, or any other form of media. Synchronous multimedia collaboration sessions may also permit a user to share the user's screen with other members of the synchronous multimedia collaboration session. In some aspects, members of the synchronous multimedia collaboration session may mark-up, comment on, draw on, or otherwise annotate a shared screen. In further aspects, such annotations may be saved and persisted after the synchronous multimedia collaboration session has ended. A canvas may be created directly from a synchronous multimedia collaboration session to further enhance the collaboration between users.

In some aspects, a user may start a synchronous multimedia collaboration session via a toggle in synchronous multimedia collaboration session pane 216 shown in FIG. 2B. Once a synchronous multimedia collaboration session has been started, synchronous multimedia collaboration session pane 216 may be expanded to provide information about the synchronous multimedia collaboration session such as how many members are present, which user is currently talking, which user is sharing the user's screen, and/or screen share preview 231. In some aspects, users in the synchronous multimedia collaboration session may be displayed with an icon indicating that they are participating in the synchronous multimedia collaboration session. In further aspects, an expanded view of the participants may show which users are active in the synchronous multimedia collaboration session and which are not. Screen share preview 231 may depict the desktop view of a user sharing the user's screen, or a particular application or presentation. Changes to the user's screen, such as the user advancing to the next slide in a presentation, will automatically be depicted in screen share preview 231. In some aspects, screen share preview 231 may be actuated to cause screen share preview 231 to be enlarged such that it is displayed as its own pane within the group-based communication system. Synchronous multimedia collaboration session pane 216 may comprise tools for the synchronous multimedia collaboration session allowing a user to mute the user's microphone or invite other users. In some aspects, synchronous multimedia collaboration session pane 216 may comprise screen share button 232. Screen share button 232 may permit a user to share the user's screen with other members of the synchronous multimedia collaboration session pane 216. In some aspects, screen share button 232 may provide a user with additional controls during a screen share. For example, a user sharing the user's screen may be provided with additional screen share controls to specify which screen to share, to annotate the shared screen, or to save the shared screen. When no synchronous multimedia collaboration session is active, synchronous multimedia collaboration session pane 216 may be associated with a currently selected channel, direct message, or multi-person direct message such that a synchronous multimedia collaboration session may be initiated and associated with the currently selected channel, direct message, or multi-person direct message. Similarly, when a synchronous multimedia collaboration session is active, the synchronous multimedia collaboration session pane 216 may be associated with a channel in which the synchronous multimedia collaboration session was initiated. In some aspects, synchronous multimedia collaboration session pane 216 may instead be unassociated with any channels, multi-person direct messages, or direct messages.

A list of synchronous multimedia collaboration sessions may include one or more active synchronous multimedia collaboration sessions selected for recommendation. For example, the synchronous multimedia collaboration sessions may be selected from a plurality of currently active synchronous multimedia collaboration sessions. Further, the synchronous multimedia collaboration sessions may be selected based in part on user interaction with the sessions or some association of the instant user with the sessions or users involved in the sessions. For example, the recommended synchronous multimedia collaboration sessions may be displayed based in part on the instant user having been invited to a respective synchronous multimedia collaboration session or having previously collaborated with the users in the recommended synchronous multimedia collaboration session. In some aspects, the list of synchronous multimedia collaboration sessions further includes additional information for each respective synchronous multimedia collaboration session, such as an indication of the participating users or number of participating users, a topic for the synchronous multimedia collaboration session, and/or an indication of an associated group-based communication channel, multi-person direct message conversation, or direct message conversation.

In some aspects, a list of recommended active users may include a plurality of group-based communication system users recommended based on at least one of user activity, user interaction, or other user information. For example, the list of recommended active users may be selected based on an active status of the users within the group-based communication system; historic, recent, or frequent user interaction with the instant user (such as communicating within the group-based communication channel); or similarity between the recommended users and the instant user (such as determining that a recommended user shares common membership in channels with the instant user). In some aspects, machine learning techniques such as cluster analysis can be used to determine recommended users. The list of recommended active users may include status user information for each recommended user, such as whether the recommended user is active, in a meeting, idle, in a synchronous multimedia collaboration session, or offline. In some aspects, the list of recommended active users further comprises a plurality of actuatable buttons corresponding to some of or all the recommended users (for example, those recommended users with a status indicating availability) that, when selected, may be configured to initiate at least one of a text-based communication session (such as a direct message conversation) or a synchronous multimedia collaboration session.

In some aspects, one or more recommended asynchronous multimedia collaboration sessions or meetings are displayed in an asynchronous meeting section. By contrast with a synchronous multimedia collaboration session (described above), an asynchronous multimedia collaboration session allows each participant to collaborate at a time convenient to them. This collaboration participation is then recorded for later consumption by other participants, who can generate additional multimedia replies. In some aspects, the replies are aggregated in a multimedia thread (for example, a video thread) corresponding to the asynchronous multimedia collaboration session. For example, an asynchronous multimedia collaboration session may be used for an asynchronous meeting where a topic is posted in a message at the beginning of a meeting thread and participants of the meeting may reply by posting a message or a video response. The resulting thread then comprises any documents, video, or other files related to the asynchronous meeting. In some aspects, a preview of a subset of video replies may be shown in the asynchronous collaboration session or thread. This can allow, for example, a user to jump to a relevant segment of the asynchronous multimedia collaboration session or to pick up where they left off previously.

In some aspects, the group-based communication system may comprise one or more canvases (or one or more links to canvases). A canvas can include a flexible workspace for curating, organizing, and sharing collections of information between users. Such canvases may be associated with a synchronous multimedia collaboration session, an asynchronous multimedia collaboration session, a channel, a multi-person direct message conversation, or a direct message conversation. Alternatively, or in addition, a user might have one or more private canvases that are not associated with any other users. Shared canvases can be configured to be accessed and/or modified by two or more users with appropriate permissions. In some aspects, canvases can be configured to enable sharing of content including (but not limited to) text, images, videos, GIFs, drawings (e.g., user-generated drawings via a drawing interface), or gaming content. In some aspects, users accessing a canvas can add new content or delete (or modify) content previously added. In some aspects, appropriate permissions may be utilized for a user to add content or to delete or modify content added by a different user. Thus, for example, some users may only be able to access a canvas in view-only mode, while other users may be able to access the canvas in an edit mode allowing those users to add or modify its contents. In some examples, a canvas can be shared via a message in a channel, multi-person direct message, or direct message, such that data associated with the canvas is accessible to and/or rendered interactable for members of the channel or recipients of the multi-person direct message or direct message.

Connecting within the Group-Based Communication System

Figure 2C:
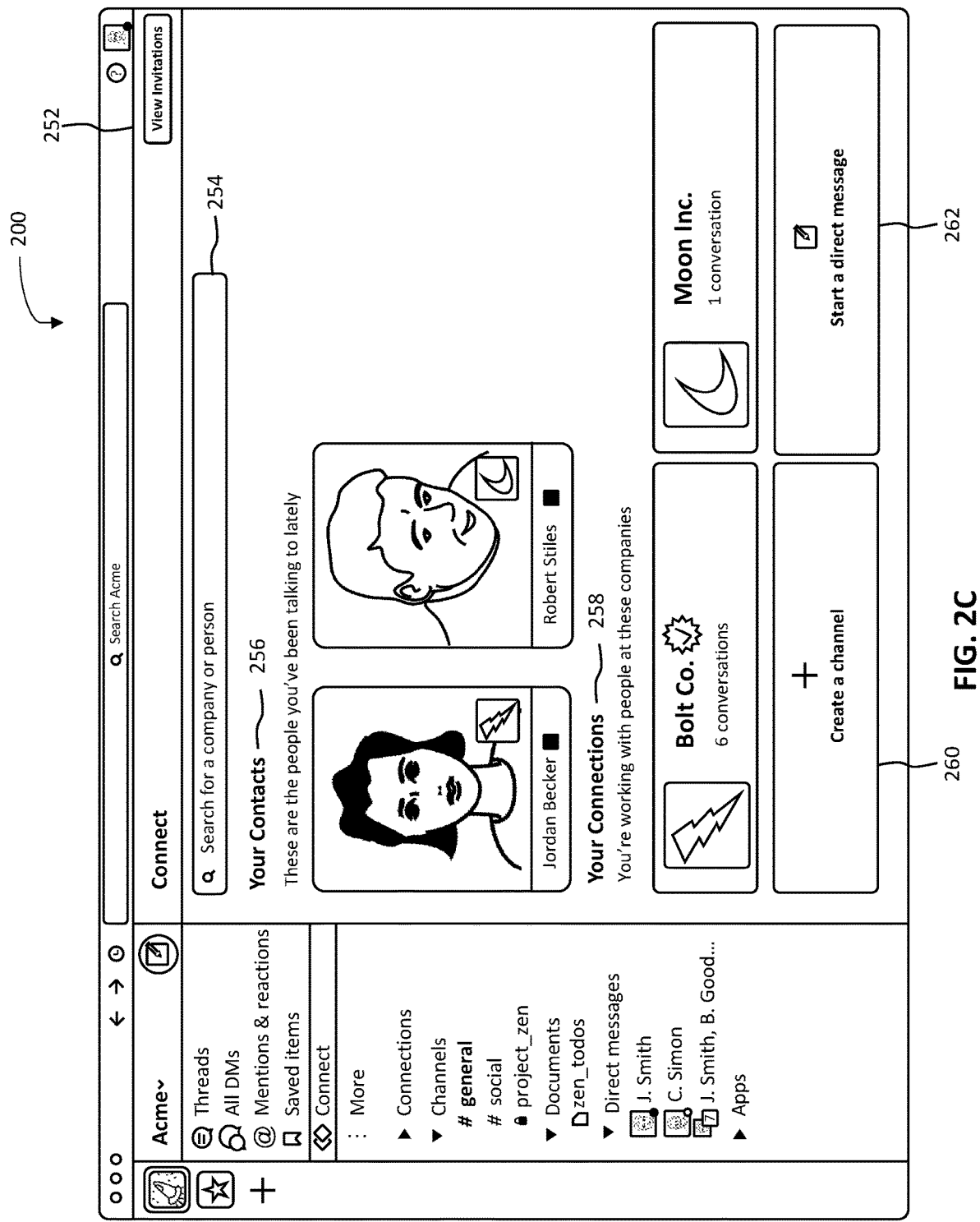
FIG. 2C illustrates a user interface for inter-organization collaboration within the group-based communication system for certain aspects of the disclosure.

FIG. 2C illustrates user interface 200 displaying connect pane 252. Connect pane 252 provides tools and resources for users to connect across different organizations, where each organization may have their own (normally private) instance of the group-based communication system or may not yet belong to the group-based communication system. For example, a first software company may have a joint venture with a second software company with whom they wish to collaborate on jointly developing a new software application. Connect pane 252 may enable users to determine which other users and organizations are already within the group-based communication system, and to invite those users and organizations currently outside of the group-based communication system to join.

Connect pane 252 may comprise connect search bar 254, recent contacts 256, connections 258, create channel button 260, and start direct message button 262. Connect search bar 254 permits a user to search for users within the group-based communication system. In some aspects, only users from organizations that have connected with the user's organization will be shown in the search results. In other aspects, users from any organization that uses the group-based communication system can be displayed. In still other aspects, users from organizations that do not yet use the group-based communication can also be displayed, allowing the searching user to invite them to join the group-based communication system. In some aspects, users can be searched for via their group-based communication system username or their email address. In some aspects, email addresses may be suggested or autocompleted based on external sources of data such as email directories or the searching user's contact list.

In some aspects, external organizations as well as individual users may be shown in response to a user search.

External organizations may be matched based on an organization name or internet domain, as search results may include organizations that have not yet joined the group-based communication system (similar to searching and matching for a particular user, discussed above). External organizations may be ranked based in part on how many users from the user's organization have connected with users of the external organization. Responsive to a selection of an external organization in a search result, the searching user may be able to invite the external organization to connect via the group-based communication system.

In some aspects, recent contacts 256 may display users with whom the instant user has recently interacted. The recent contacts 256 may display the user's name, company, and a status indication. Recent contacts 256 may be ordered based on which contacts the instant user most frequently interacts with or based on the contacts with whom the instant user most recently interacted. In some aspects each recent contact of recent contacts 256 may be an actuatable control allowing the instant user to quickly start a direct message conversation with the recent contact, invite them to a channel, or take any other appropriate user action for that recent contact.

In some aspects, connections 258 may display a list of companies (e.g., organizations) with which the user has interacted. For each company, the name of the company may be displayed along with the company's logo and an indication of how many interactions the user has had with the company, for example the number of conversations. In some aspects, each connection of connections 258 may be an actuatable control allowing the instant user to quickly invite the external organization to a shared channel, display recent connections with that external organization, or take any other appropriate organization action for that connection.

In some aspects, create channel button 260 allows a user to create a new shared channel between two different organizations. Selecting create channel button 260 may further allow a user to name the new connect channel and enter a description for the connect channel. In some aspects, the user may select one or more external organizations or one or more external users to add to the shared channel. In other aspects, the user may add external organizations or external users to the shared channel after the shared channel is created. In some aspects, the user may elect whether to make the connect channel private (i.e., accessible only by invitation from a current member of the private channel).

In some aspects, start direct message button 262 allows a user to quickly start a direct message (or multi-person direct message) with external users at an external organization. In some aspects, the external user identifier at an external organization may be supplied by the instant user as the external user's group-based communication system username or as the external user's email address. In some aspects, an analysis of the email domain of the external user's email address may affect the message between the user and the external user. For example, the external user's identifier may indicate (for example, based on an email address domain) that the user's organization and the external user's organization are already connected. In some such aspects, the email address may be converted to a group-based communication system username.

Alternatively, the external user's identifier may indicate that the external user's organization belongs to the group-based communication system but is not connected to the instant user's organization. In some such aspects, an invitation to connect to the instant user's organization may be generated in response. As another alternative, the external user may not be a member of the group-based communication system, and an invitation to join the group-based communication system as a guest or a member may be generated in response.

Collaborative Documents

Figure 2D:
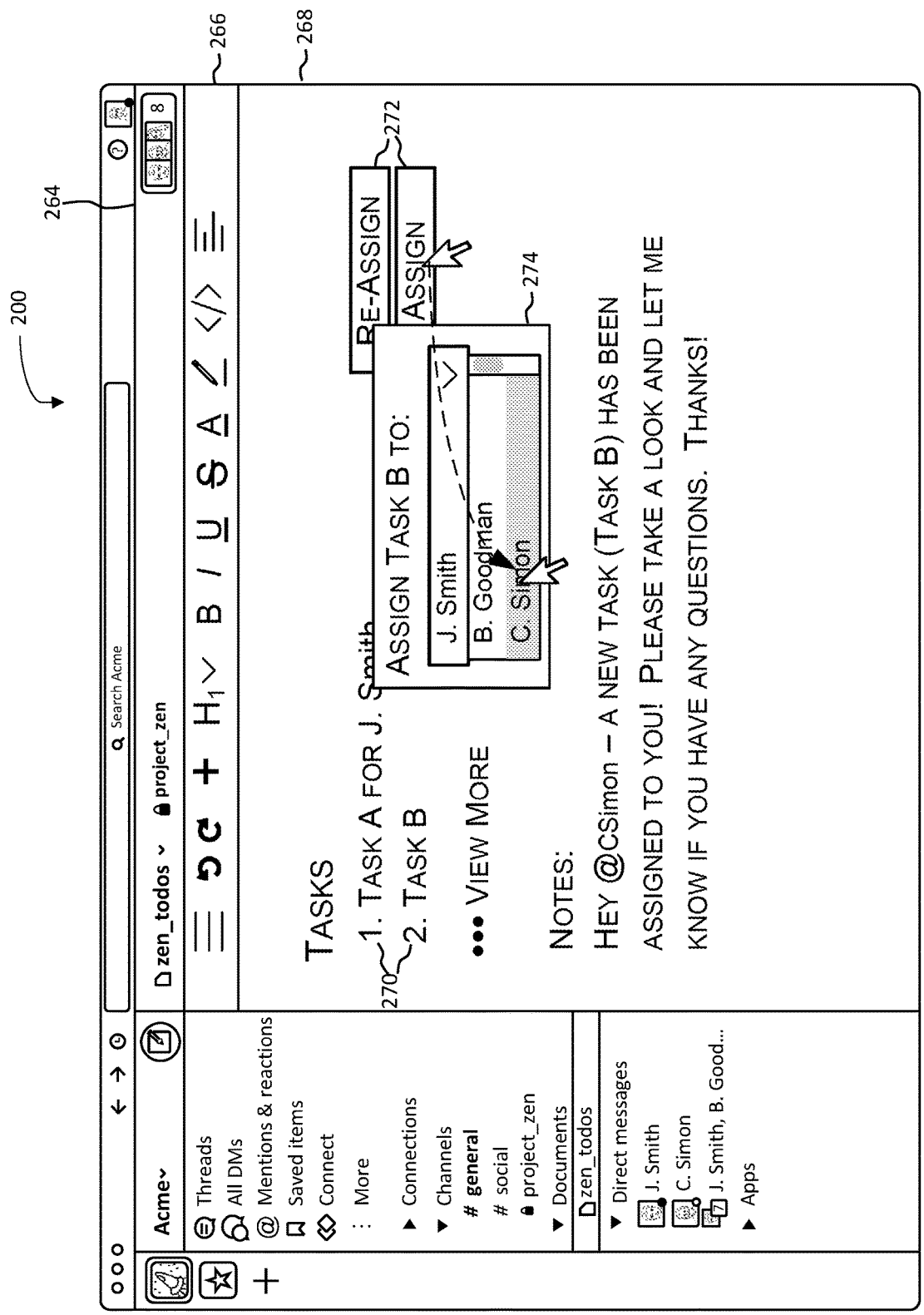
FIG. 2D illustrates a user interface for collaborative documents within the group-based communication system for certain aspects of the disclosure.

FIG. 2D illustrates user interface 200 displaying collaboration document pane 264. A collaborative document may be any file type, such as a PDF, video, audio, word processing document, etc., and is not limited to a word processing document or a spreadsheet. A collaborative document may be modified and edited by two or more users. A collaborative document may also be associated with different user permissions, such that based on a user's permissions for the document (or sections of the document as discussed below), the user may selectively be permitted to view, edit, or comment on the collaborative document (or sections of the collaborative document). As such, users within the set of users having access to the document may have varying permissions for viewing, editing, commenting, or otherwise interfacing with the collaborative document. Collaborative documents may allow users to simultaneously or asynchronously create and modify documents. Collaborative documents may integrate with the group-based communication system and can both initiate workflows and be used to store the results of workflows. Collaboration document pane 264 may comprise collaborative document toolbar 266 and collaborative document 268. In some aspects, collaborative document toolbar 266 may provide the ability to bold, italicize, underline, or otherwise format text, the ability to undo or redo actions, the ability to insert and format pictures and shapes, or any other word processing functionality to modify the content within collaborative document 268.

In some aspects, collaborative documents may comprise free-form unstructured sections and workflow-related structured sections. In some aspects, unstructured sections may include areas of the document in which a user can freely modify the collaborative document without any constraints. For example, a user may be able to freely type text to explain the purpose of the document. In some aspects, a user may add a workflow or a structured workflow section by typing the name of (or otherwise mentioning) the workflow. In further aspects, typing the "at" sign (@), a previously selected symbol, or a predetermined special character or symbol may provide the user with a list of workflows the user can select to add to the document. For example, a user may indicate that a marketing team member needs to sign off on a proposal by typing "!Marketing Approval" to initiate a workflow that culminates in a member of the marketing team approving the proposal. Placement of an exclamation point prior to the group name of "Marketing Approval" initiates a request for a specification action, in this case routing the proposal for approval. In some aspects, structured sections may include text entry, selection menus, tables, checkboxes, tasks, calendar events, or any other document section. In further aspects, structured sections may include text entry spaces that are a part of a workflow. For example, a user may enter text into a text entry space detailing a reason for approval, and then select a submit button that will advance the workflow to the next step of the workflow. In some aspects, the user may be able to add, edit, or remove structured sections of the document that make up the workflow components.

In aspects, sections of the collaborative document may have individual permissions associated with them. For example, a collaborative document having sections with individual permissions may provide a first user permission to view, edit, or comment on a first section, while a second user does not have permission to view, edit, or comment on the first section. Alternatively, a first user may have permissions to view a first section of the collaborative document, while a second user has permissions to both view and edit the first section of the collaborative document. The permissions associated with a particular section of the document may be assigned by a first user via various methods, including manual selection of the particular section of the document by the first user or another user with permission to assign permissions, typing or selecting an "assignment" indicator, such as the "@" symbol, or selecting the section by a name of the section. In further aspects, permissions can be assigned for a plurality of collaborative documents at a single instance via these methods. For example, a plurality of collaborative documents each has a section entitled "Group Information," where the first user with permission to assign permissions desires an entire user group to have access to the information in the "Group Information" section of the plurality of collaborative documents. In aspects, the first user can select the plurality of collaborative documents and the "Group Information" section to effectuate permissions to access (or view, edit, etc.) to the entire user group the "Group Information" section of each of the plurality of collaborative documents. In some aspects, the collaborative document comprises one or more tasks 270 along with one or more corresponding instances of assignment options 272, as shown. In some aspects, an assignment dropdown menu 274 may be displayed in response to a user selecting one of the assignment options 272.

Interactive User Status

Aspects of the present disclosure provide a technical solution to one or more of the aforementioned technical problems. Specifically, aspects of the present disclosure provide interactive user statuses that increase accessibility to features within the group-based communication system, as well as increasing accessibility to external applications or resources. The present disclosure further increases processing efficiency by preventing unnecessary channels and pages from being loaded because the user is directly routed to the desired resource via the interactive user status. Accordingly, the user does not superfluously consume data and processing resources by searching for and navigating to a particular resource within multiple channels and pages of the group-based communication system. For example, aspects of the present disclosure may provide a user status capable of directly routing a user to an activity or resource from within the group-based communication system.

Additionally, aspects of the disclosure provide an improved means for conveying additional information using an interactive user status to present information related to the activities or resources linked to the user status. For example, in some aspects of the present disclosure, a user status may be optionally expanded to display additional information relating to a collaborative activity or resource that is associated with and accessible through the user status. As such, users are able to seamlessly gain relevant insight and accessibility through the interactive user status such that unnecessary interactions and processes are avoided. Another advantage afforded by incorporating interactive user statuses is that user discovery and engagement with features inside and outside of the group-based communication system are significantly increased because users can directly share access to said features.

Further, aspects of the present disclosure provide a means to automatically update a user status based on user activity within the group-based communication system. For example, some aspects of the disclosure contemplate utilizing a machine learning model trained with historical user activity and user status data to automatically update a user status within the group-based communication system and, in some cases, determine relevant resources and features that should be linked to the user status.

Figure 3A:
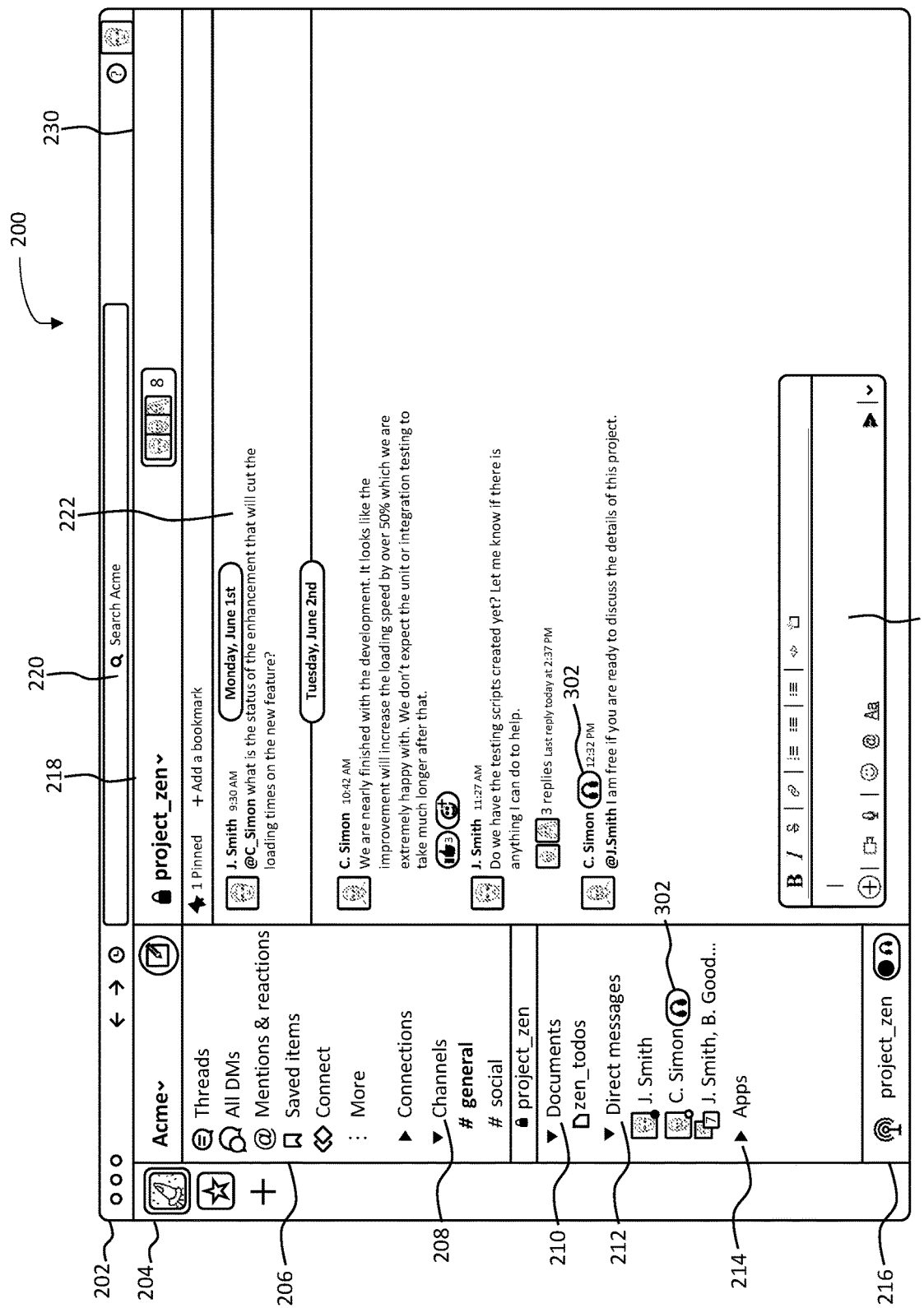
FIGS. 3A-3C illustrate a user interface including a user status corresponding to a synchronous multimedia collaboration session relating to some aspects of the disclosure.

FIG. 3A illustrates one example of a user interface 200 relating to some aspects of the disclosure. In some aspects of the disclosure a user status 302 may be associated with a particular user. For example, a first user may have a first user status assigned to them within the group-based communication system. The user status 302 may be presented within the user interface 200, as shown, such that other users are able to view the user status. In some aspects, the user status 302 may be set manually by the user or automatically based on one or more user interactions of the user.

The user status 302 may include any combination of a graphical icon and text. For example, in some aspects, the user status 302 may comprise one of a graphical icon or text. However, in some aspects, the user status 302 may include both a graphical icon and text. In some cases, the text may include a textual description of the user status 302.

In some aspects, the user status 302 may be displayed in multiple locations within the user interface 200, such as adjacent to the direct messages 212 or the messages 222 of the user, as shown. In certain aspects, the user status 302 may be at least partially interactive. For example, users may be able to access one or more resources or activities that are associated with the user status 302 via the user status 302. Further, the user status 302 may include additional information relating to said one or more resources or activities that may be accessed through the user status 302.

Figure 3B:
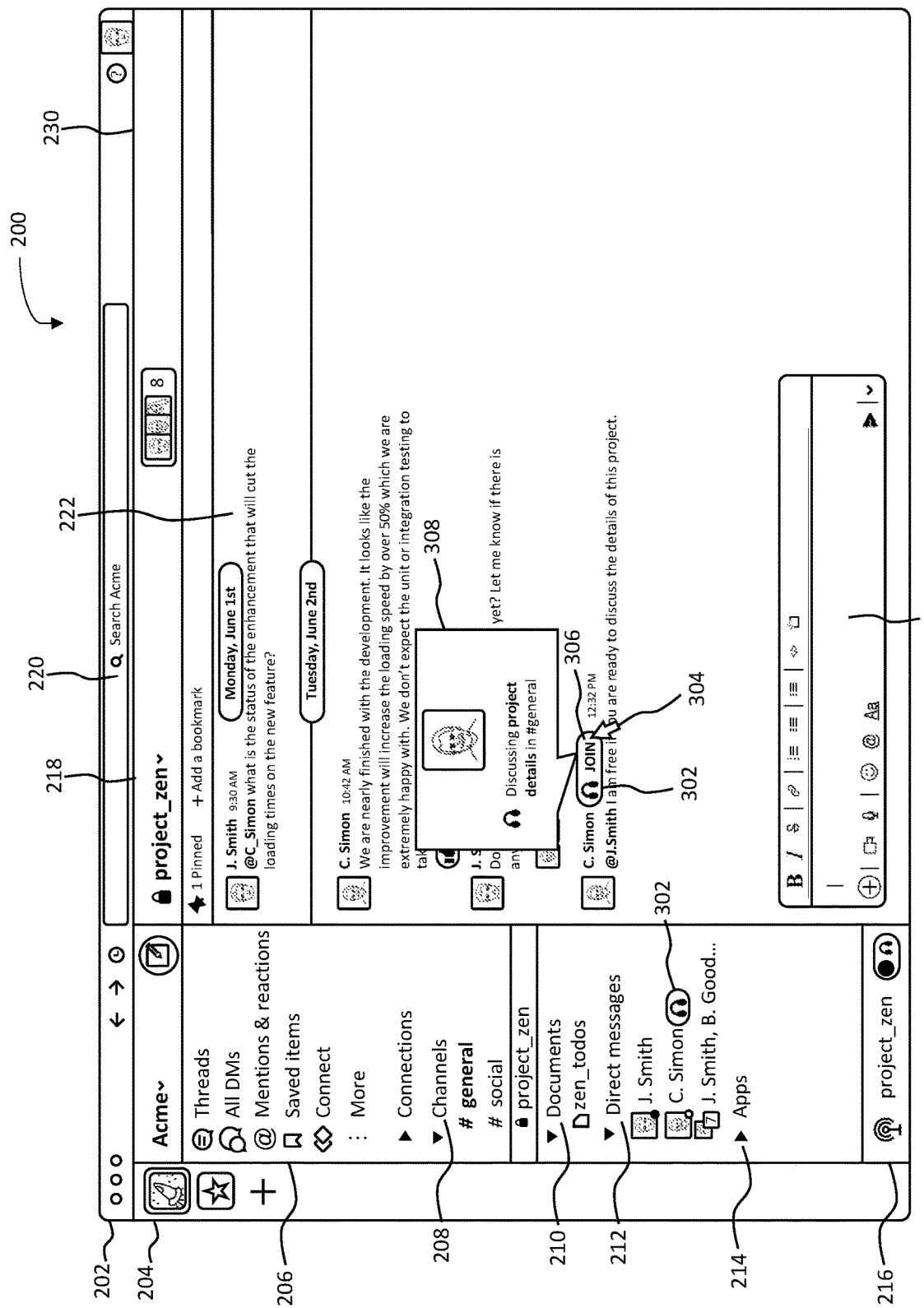

FIG. 3B illustrates another example of a user interface 200 relating to some aspects of the disclosure. In some aspects, a user may interact with the user interface 200 using a mouse and keyboard, touch screen, or other suitable input device. For example, the user may control a cursor 304 displayed within the user interface 200. In some aspects, additional information and options may be accessed responsive to the user interacting with the user status 302 of another user. For example, in some aspects, the user status 302 may be expanded responsive to the user hovering over or proximate to the user status 302 with the cursor 304. Alternatively, or additionally, the user status 302 may be expanded responsive to a user clicking or tapping the user status 302 or by interacting with the user status 302 in some other way using another suitable input mechanism. Further, in some aspects, a time threshold is contemplated that denotes a time period after which the user status 302 is expanded when the cursor 304 hovers over the user status 302 or is held in proximity to the user status 302. For example, in some aspects, the user status 302 is expanded responsive to the cursor 304 hovering over the user status 302 for 1 second, 2 seconds, 5 seconds, or any other suitable period of time. Alternatively, or additionally, in some aspects, the user status 302 may be expanded immediately after being hovered over or approached by the cursor 304 or other input mechanism.

The user status 302 may be associated with a synchronous multimedia collaboration session of the group-based communication system. In some aspects, the user status 302 may be expanded responsive to a user interaction to include a button 306, as shown. The button 306 may be operable to provide access to the synchronous multimedia collaboration session. For example, a user may join the synchronous multimedia collaboration session by selecting the button 306 of the user status 302. Additionally, in some aspects, additional information relating to the user status 302 may be presented in the form of a popup 308, as shown. Here, the additional information included in the popup 308 may include, for example, information relating to the synchronous multimedia collaboration session such as a description of a channel associated with the synchronous multimedia collaboration session and/or a topic associated with the synchronous multimedia collaboration session, as shown. In some such cases, the topic for the synchronous multimedia collaboration session may be set manually by participants or automatically based on user data associated with the synchronous multimedia collaboration session. For example, a discussion topic may be extracted by reviewing textual or audio information communicated by participants in the synchronous multimedia collaboration session.

In some aspects, the user status 302 is expanded to include additional information relating to the synchronous multimedia collaboration session such as any of a channel identifier associated with the synchronous multimedia collaboration session, a duration time that the synchronous multimedia collaboration session has been active, and a list of users currently participating in the synchronous multimedia collaboration session, as well as other suitable information relating to the synchronous multimedia collaboration session or the user status 302.

Figure 3C:
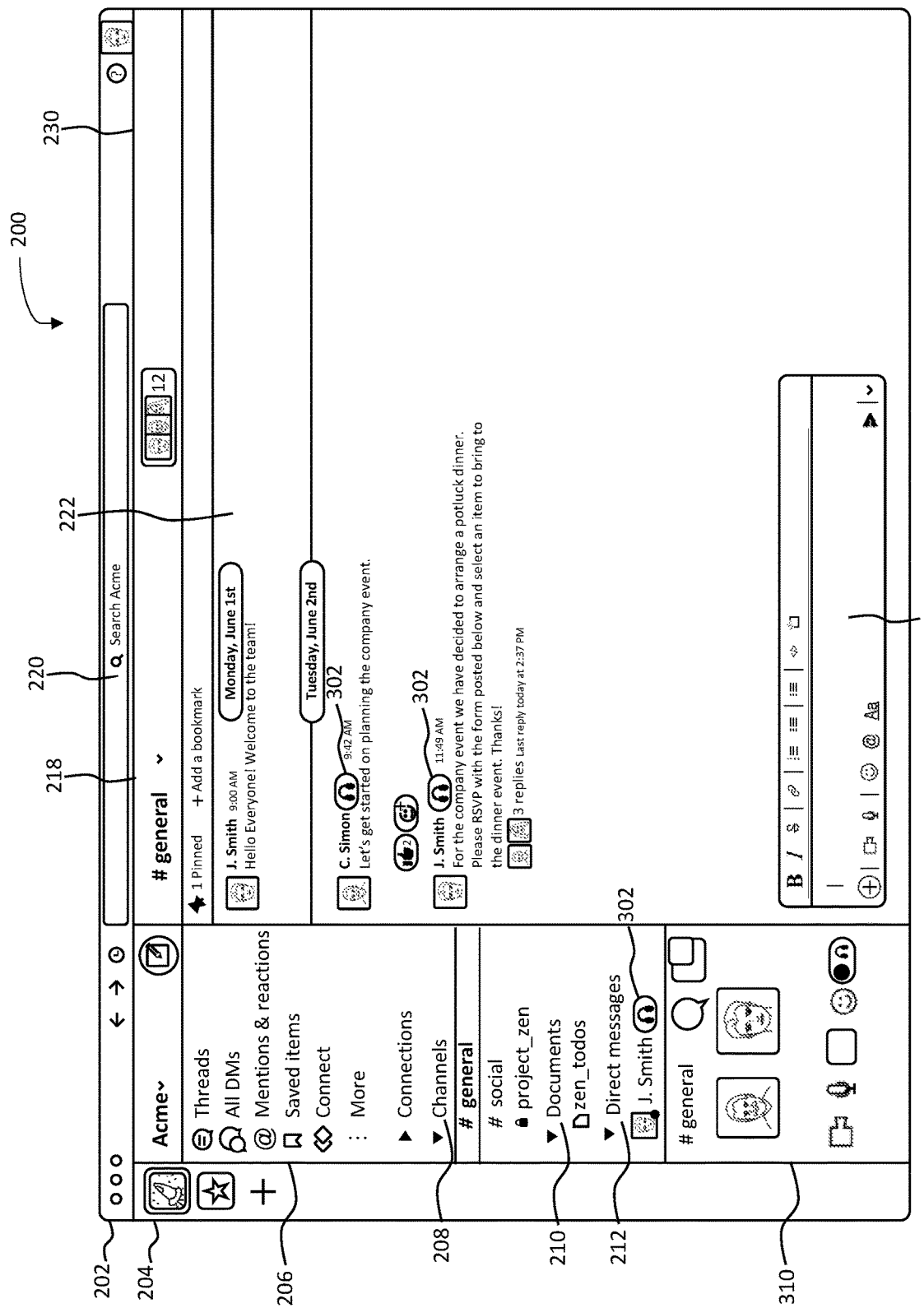

FIG. 3C illustrates another example of a user interface 200 relating to some aspects of the disclosure. In some such aspects, the user interface 200 is updated to reflect that the user has joined the synchronous multimedia collaboration session via the user status 302. Accordingly, the user status 302 of the joined user is also updated, as shown, to show that the user has joined the synchronous multimedia collaboration session. Additionally, a synchronous multimedia collaboration session pane 310 may be included in the user interface 200 to display additional information relating to the synchronous multimedia collaboration session such as a list of participant users and selection options for adjusting parameters of the synchronous multimedia collaboration session.

Figure 4A:
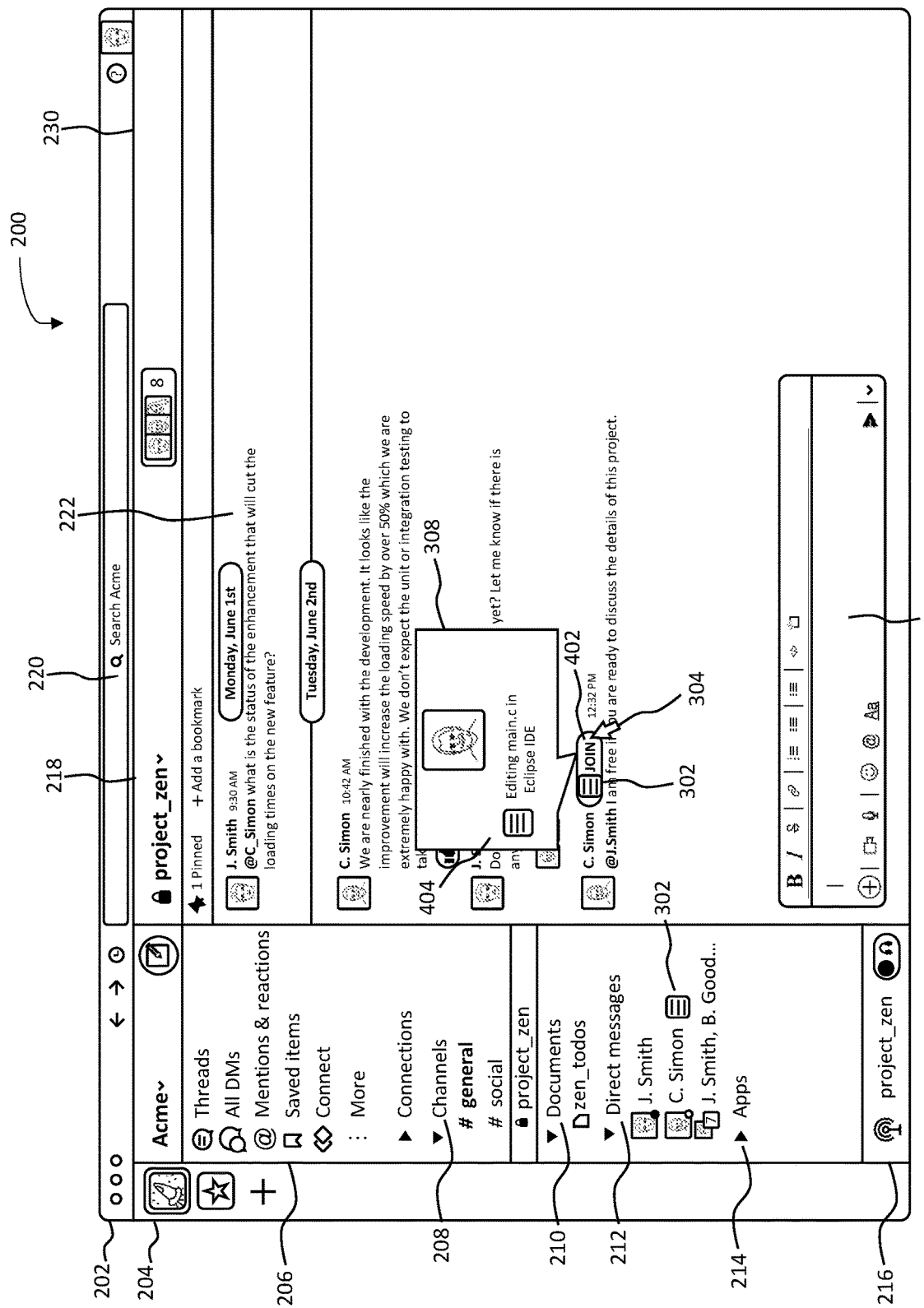
FIGS. 4A-4B illustrate a user interface including a user status corresponding to a collaborative document relating to some aspects of the disclosure.

FIG. 4A illustrates another example of a user interface 200 relating to some aspects of the disclosure. In some such aspects, the user status 302 may correspond to an external application that a first user is using, such as, for example, a code editing application, as shown. Accordingly, the popup 308 may include additional information such as a description 404 that the first user is writing code in the code editor application and the button 402 may be operable to provide access to a second user to the code editor application. For example, a second user may access a collaborative code editor via the button 402 of the user status 302 to collaborate with the first user. In some aspects, the user status 302 may be automatically updated based on the user's interaction with an external application. For example, an API integration may be included to monitor user interaction with an external application to automatically determine whether a user is using an external application and what the user is doing within the external application. In some such aspects, users may manually adjust permission settings with respect to what information is included in the user status.

In some aspects, the user status 302 may be expanded to include additional information relating to the user status 302 such as the description 404, as shown, or other information relating to the user status 302. For example, the additional information may include an unfurl of information relating to a resource linked to the user status 302. For example, the user status 302 may include a button operable to access a web resource or other resource and the additional information may include an unfurl relating to said resource such as a preview of a web page. In some aspects, the button 402 is operable to automatically join the second user to the first user within a collaborative document, which may be internal or external to the group-based communication system. Accordingly, in some cases, selection of the button 402 may result in automatically accessing or initiating a third-party application or automatically accessing a web page or web resource on the user device of the second user.

Figure 4B:
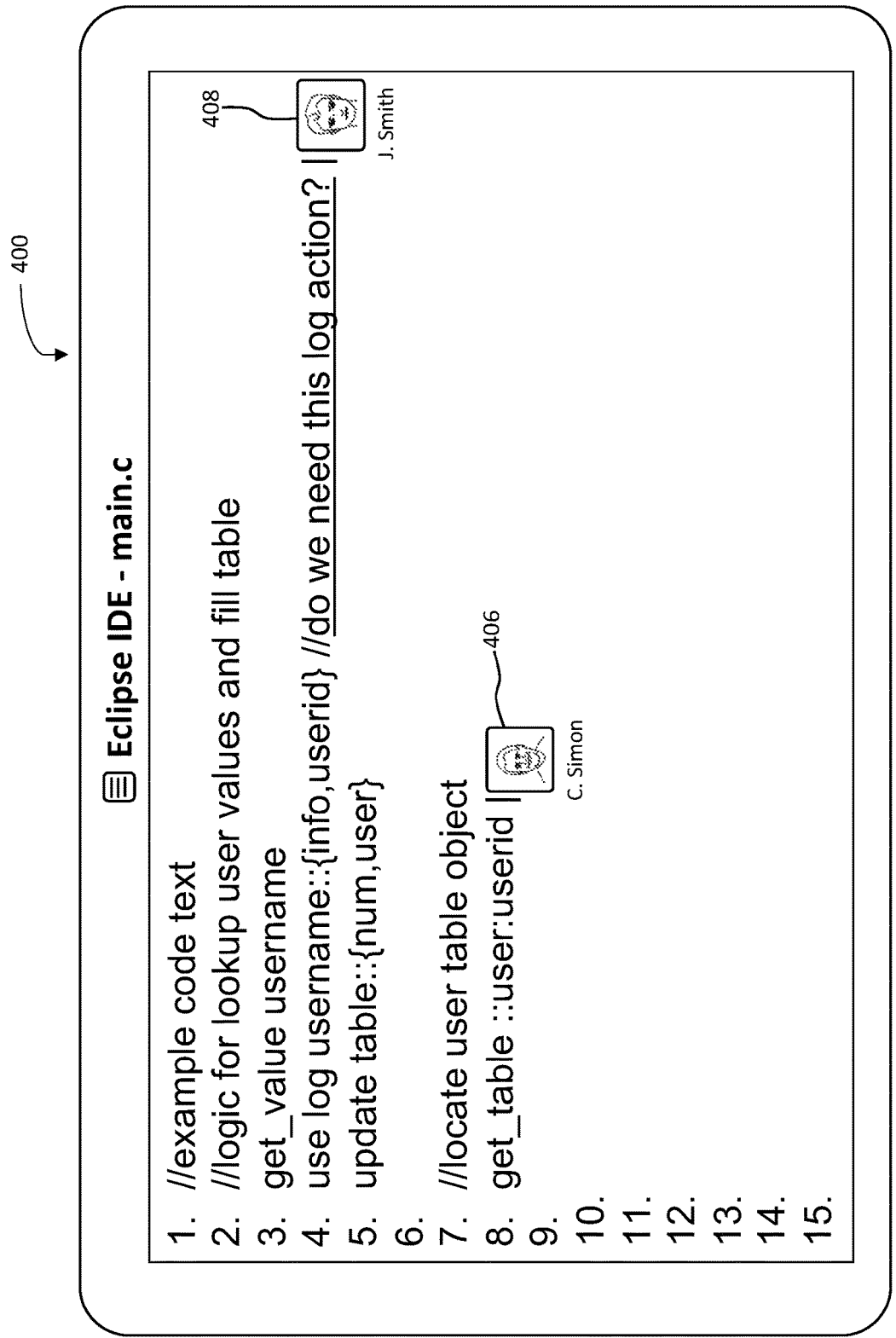

FIG. 4B illustrates one example of a code editor user interface 400 of an exemplary external code editor application relating to some aspects of the disclosure. The code editor application may be external and distinct from the group-based communication system. Accordingly, the code editor application may be automatically initiated or accessed on a user device of the second user responsive to the second user selecting the button 402. The code editor user interface 400 may provide an environment for one or more users to write and edit a script, as shown. In some aspects, the code editor user interface 400 may be used, for example, for a plurality of users to co-edit source code or collaborate on a similar activity. Accordingly, a first user avatar 406 corresponding to a first user and a second user avatar 408 corresponding to a second user may be included on the code editor user interface 400. It should be understood that other types of user statuses may be included relating to a variety of different external applications that may, in some aspects, be distinct from the group-based communication system and internal features of the group-based communication system. For example, a user status 302 may correspond to a collaborative document that a user is accessing and said user status 302 may allow other users to access the collaborative document from within the group-based communication system.

Figure 5:
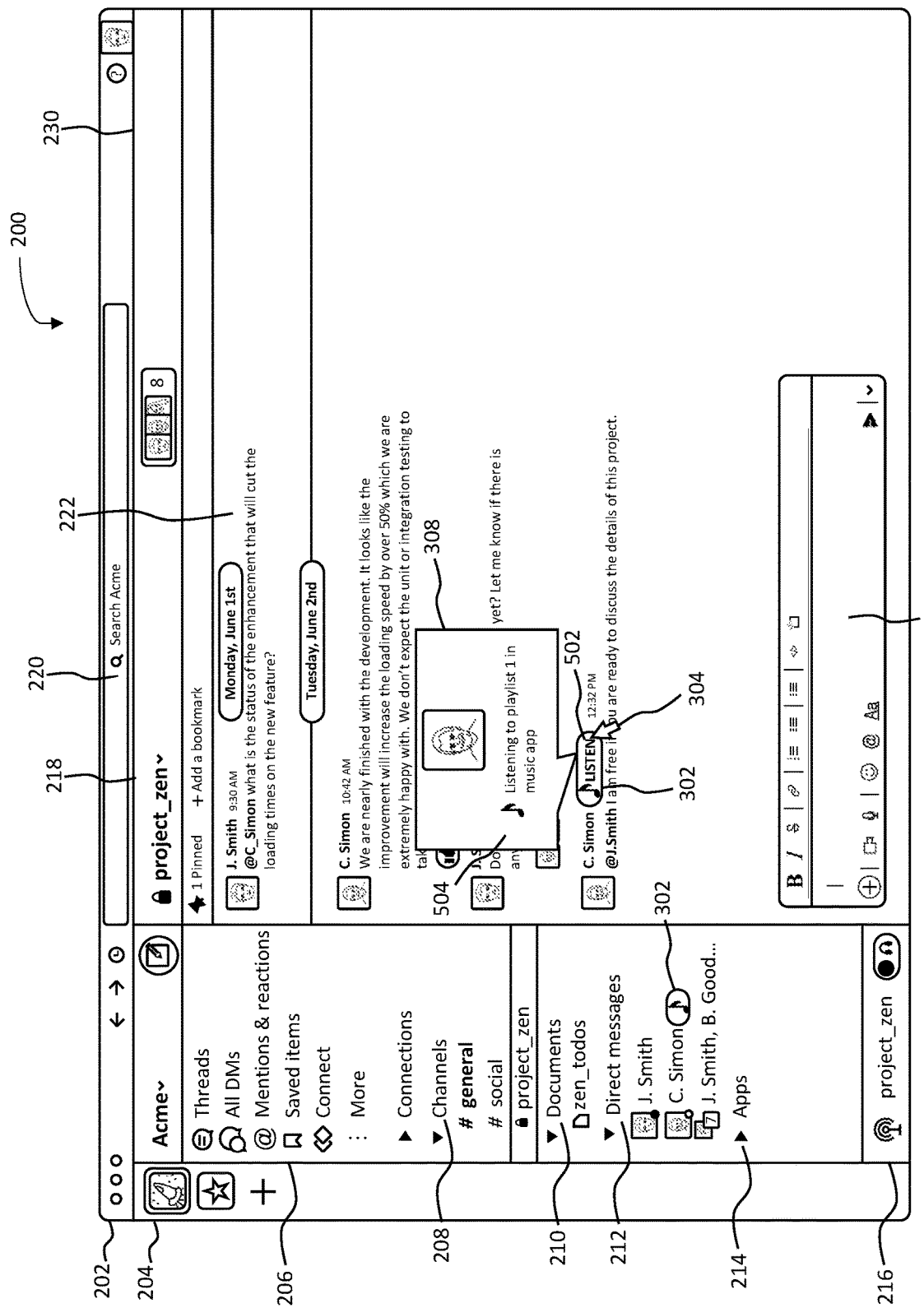
FIG. 5 illustrates a user interface including a user status corresponding to a music application relating to some aspects of the disclosure.

FIG. 5 illustrates another example of a user interface 200 relating to some aspects of the disclosure. In some such aspects, the user status 302 may correspond to a music application. For example, a first user may set their user status to be automatically updated based on interaction with an external music application integrated into or distinct from the group-based communication system. In some cases, API information may be used to automatically update the user status 302. The user status 302 may include a button 502 operable to access the music application. In some cases, the button 502 may provide access to a specific playlist that the first user is listening to. Alternatively, or additionally, access may be provided to a particular music track or a specific playback point within the track corresponding to the first user's progress within the track such that the users can share in a listening experience.

In some aspects, the user status 302 may be expanded to include additional information relating to the user status 302 such as a description 504 of the music that the first user is currently listening to or has linked to user status 302, as shown. In some aspects, the description 504 may indicate a specific playlist or track that the first user is listening to, as well as the application that the first user is using to listen to music. Accordingly, the button 502 may be operable to automatically provide access to a variety of resources internal to and external to the group-based communication system. For example, in some aspects, selection of the button 502 causes an external third-party application to be initiated or accessed on the user device of the second user for the second user to access the music corresponding to the user status 302 of the first user.

Figure 6:
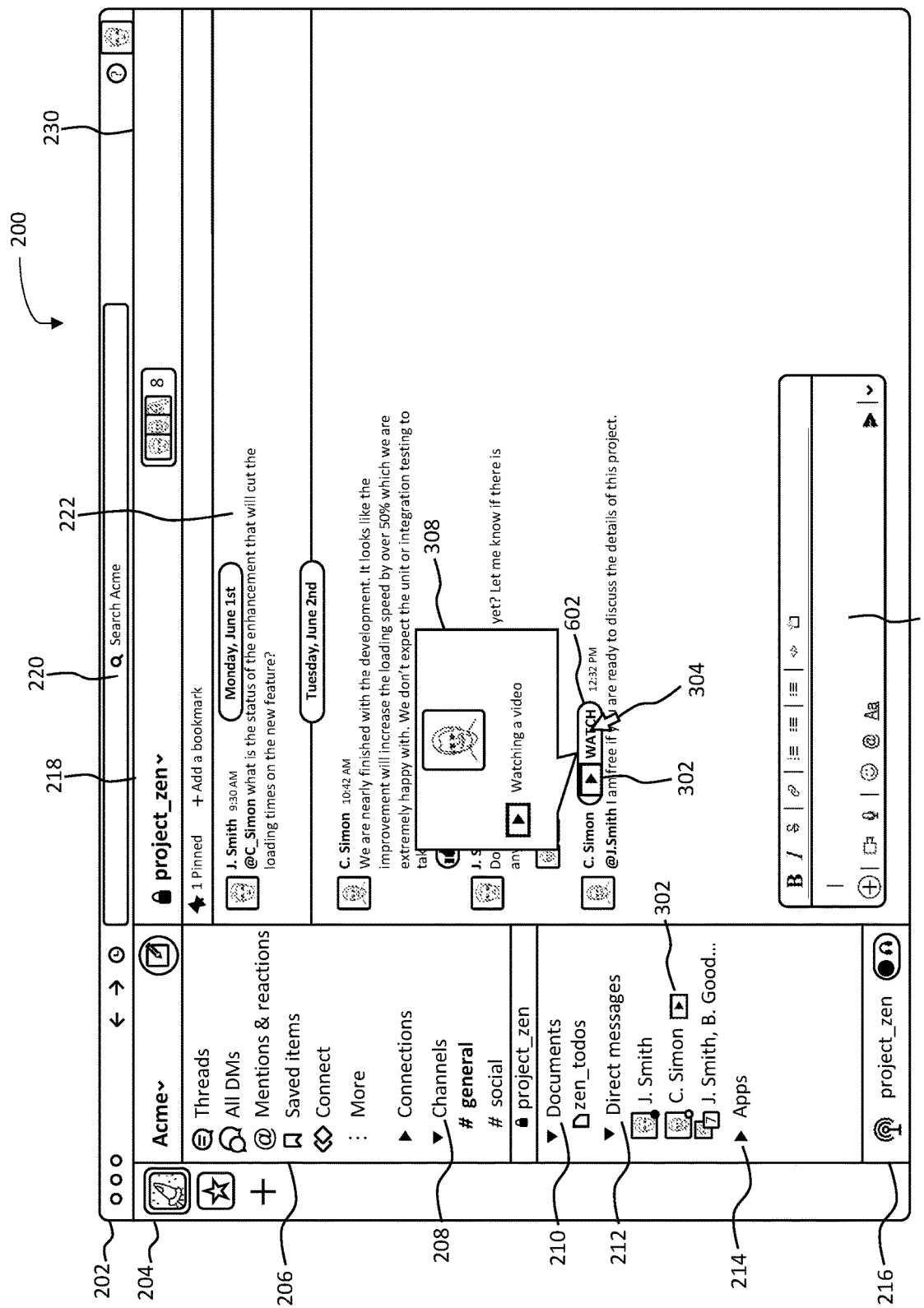
FIG. 6 illustrates a user interface including a user status corresponding to a sharable video relating to some aspects of the disclosure.

FIG. 6 illustrates another example of a user interface 200 relating to some aspects of the disclosure. In some such aspects, the user status 302 may be associated with watching a video. For example, the user status 302 may be automatically updated based on a determination that the first user is watching a video within an external video application or within the group-based communication system. Accordingly, a button 602 may be included in the user status 302. The button 602 may be operable to access the video that the first user is currently watching. Alternatively, or additionally, the button 602 may be operable to join a watch party with the first user in which a plurality of users can share a synchronized experience of watching a video or movie.

Figure 7:
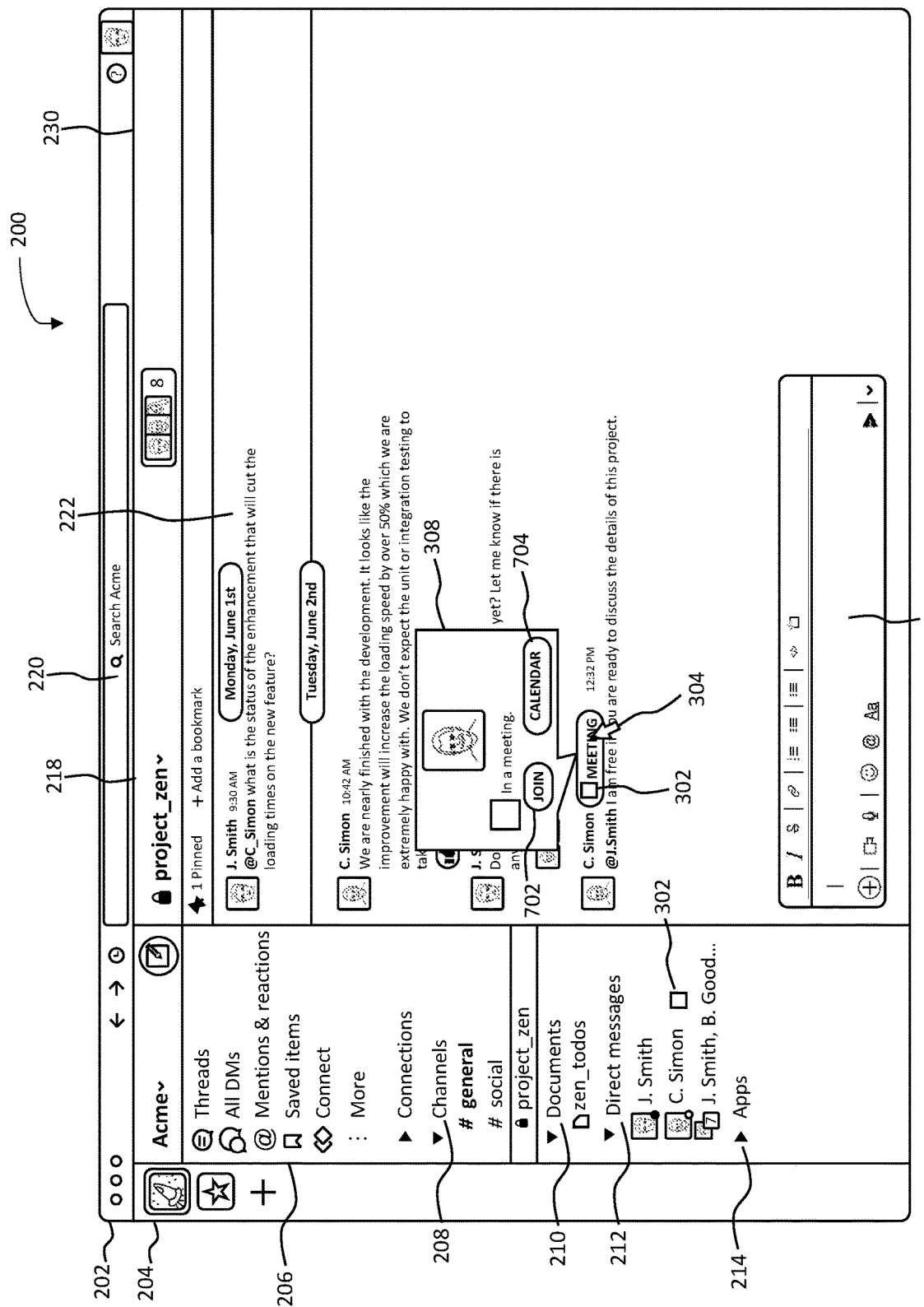
FIG. 7 illustrates a user interface including a user status corresponding to a meeting relating to some aspects of the disclosure.

FIG. 7 illustrates another example of a user interface 200 relating to some aspects of the disclosure. In some such aspects, the user status 302 corresponds with a meeting participation of the first user, as shown. The user status 302 may include any of a button 702 operable to allow other users to join the meeting and a button 704 operable to access a calendar or schedule of the first user, for example, to check the availability of the first user or to schedule a subsequent meeting when the first user becomes available. In some cases, the meeting may be either a physical or virtual meeting. For example, the user status 302, in some cases, may be associated with a synchronous video meeting that the user is participating in with one or more other users. Similarly, the button 704 may be operable to access a schedule of the user and/or to schedule a subsequent meeting that is either a physical meeting or a virtual meeting.

In some cases, the specific buttons that are presented may be determined based on the viewing user's access permissions. For example, if the user does not have permission to join the meeting, the button 702 may be suppressed. Further, in some aspects, a user may prevent other users from accessing or viewing their schedule such that the button 70 may be suppressed or deactivated.

Figure 8A:
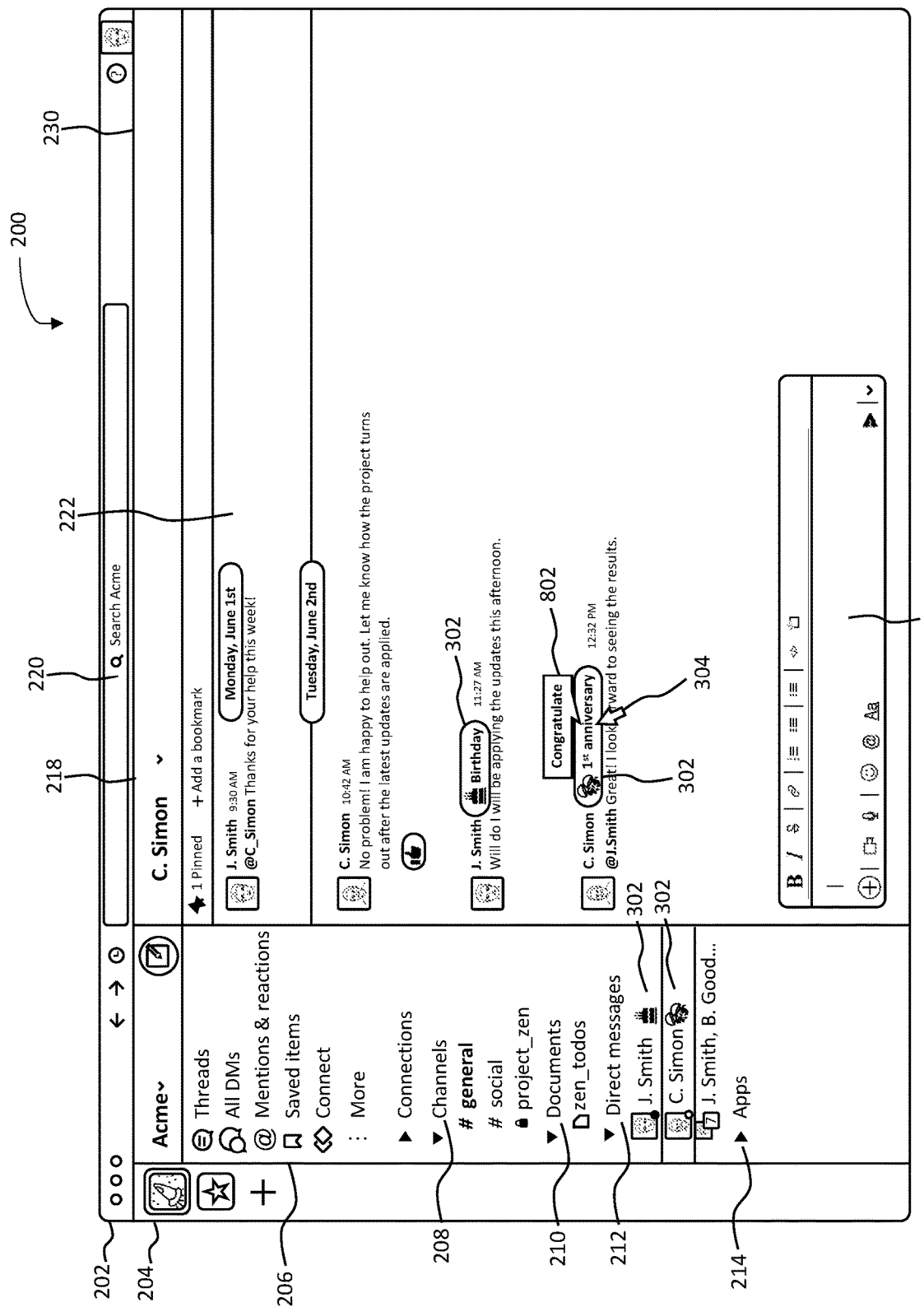
FIG. 8A-8C illustrate a user interface including a user status corresponding to a celebration event relating to some aspects of the disclosure.

FIG. 8A illustrates another example of a user interface 200 relating to some aspects of the disclosure. In some such aspects, the user status 302 corresponds to a work anniversary of the first user. Additionally, another user status 302 of a second user may correspond to a birthday of the second user. Either the work anniversary user status or the birthday user status may be automatically set based on user data stored within a user profile for the respective user. The user status 302 may include a button 802 operable to send a message to the first user. For example, a congratulations message may be automatically suggested for the user to send or a prompt may be displayed for the user to draft a custom congratulatory message. In some embodiments, the button 802 may be displayed in response to a user hovering over the user status 302 with the cursor 304 or interacting with the user status 302 in some other way.

Figure 8B:
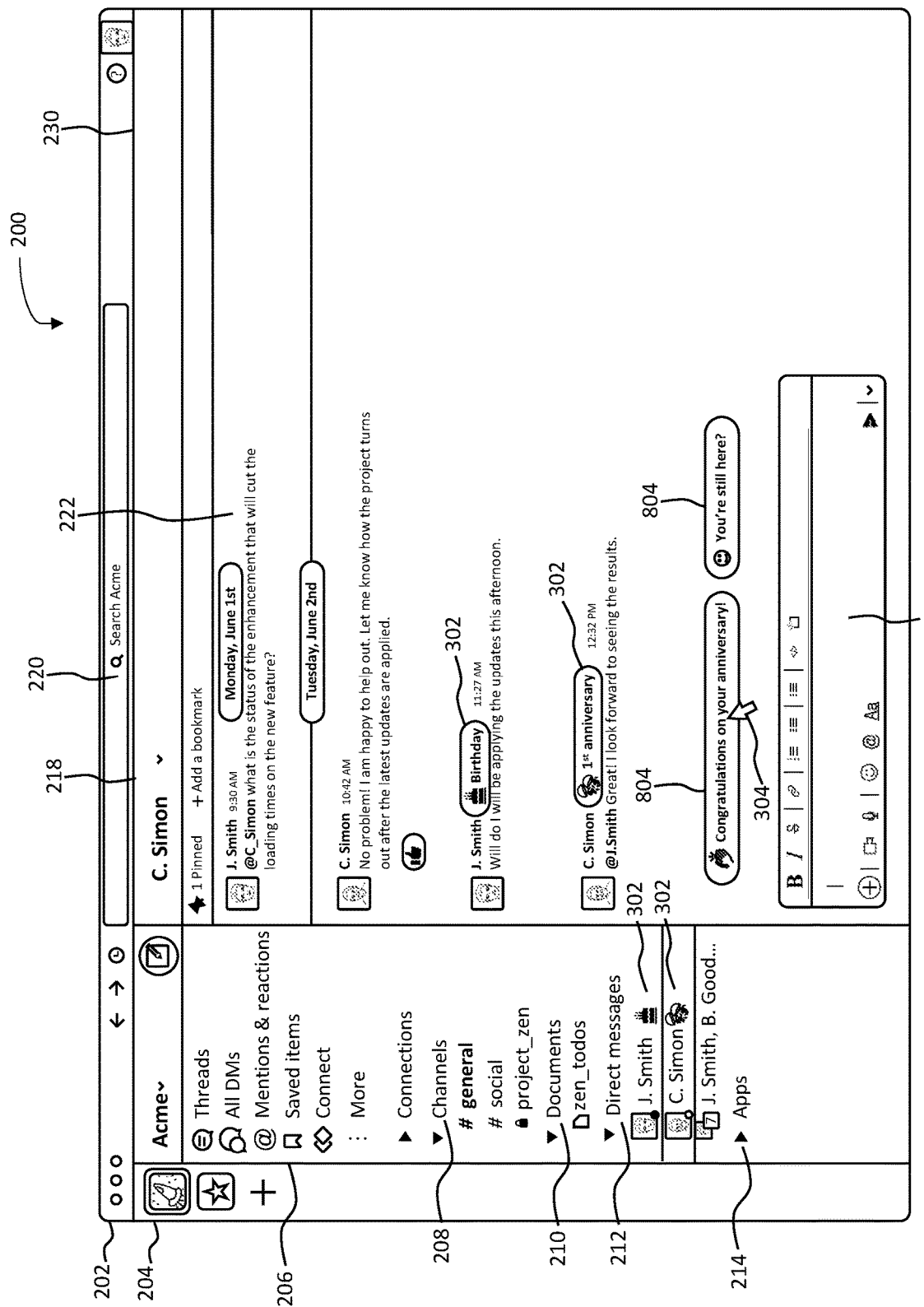

FIG. 8B illustrates another example of a user interface 200 relating to some aspects of the disclosure. Continuing the example described above, a viewing user may select the button 802, which causes one or more instances of message suggestion 804 to be displayed within the user interface 200, as shown. In some cases, the one or more instances of message suggestion 804 may be determined automatically based on historical user message data or other historical data relating to the group-based communication system. Alternatively, or additionally, in some aspects, one or more message suggestions may be preconfigured for a particular user status. Further, aspects are contemplated in which preconfigured default message suggestions are initially used and then the suggested messages are updated adaptively overtime based on user inputs in a particular workspace or across the group-based communication system.

Figure 8C:
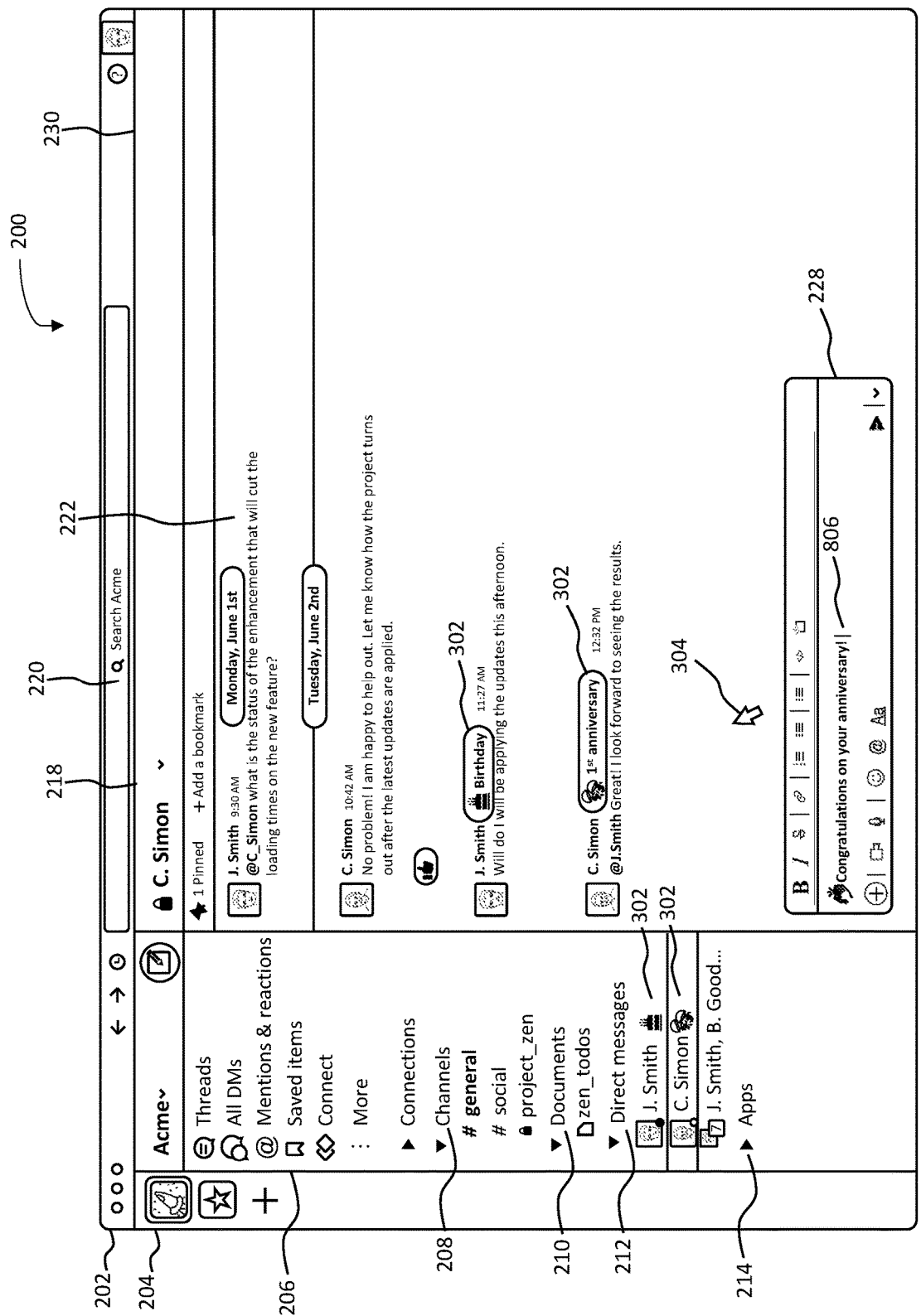

FIG. 8C illustrates another example of a user interface 200 relating to some aspects of the disclosure. Upon selection of a message suggestion 804, the contents of the message suggestion 804 selected by the user is automatically added into the compose pane 228 as a message 806 to the first user. The message 806 may include contents such as any of text, symbols, emojis, attachments, or a combination thereof. In some cases, the message 806 may be automatically sent as a direct message to the first user. Further, in some cases, the message 806 may be sent in a particular channel or type of channel based on the type of user status. Alternatively, in some aspects of the present disclosure, the message 806 may be sent directly responsive to selection of a message suggestion 804 such that the message contents are not shown in the compose pane 228.

In some aspects, additional interactive effects are contemplated in associated with the user status 302. For example, a sound may be played back responsive to sending and or receiving the message 806. Additionally, or alternatively, in some aspects, images or animations may be displayed responsive to sending or receiving the message 806. In some such aspects, any of the sounds, images, and animations may correspond to the type of user status 302. For example, if the user status 302 relates to a work anniversary, birthday, or other celebratory event, a confetti animation may be initiated within the user interface 200 responsive to sending and/or receiving the message 806. In some aspects, the sound, image, and animation may be initiated both in a user interface of the sending user and a user interface of the receiving user when the receiving user receives the message 806 submitted based on the message suggestion 804 selected by the user.

It should be understood that similar suggested reactions and responses are contemplated for a variety of other user statuses. For example, a button may be included for another user status to congratulate a user on another type of milestone or achievement of the user. In some aspects, user statuses relating to other forms of celebratory events are contemplated. For example, a user status may be included to reflect that a user was recently promoted or recently succeeded with a work endeavor or another significant event. Said user statuses may be expanded to include various buttons and actuatable controls to submit congratulatory messages and reactions as described herein. Further, in some aspects, responses and reactions may be determined and suggested based on previous user activity. For example, a machine learning model may be trained based on historical user responses and reactions such that relevant responses and reactions can be suggested based on a current user status.

Figure 9:
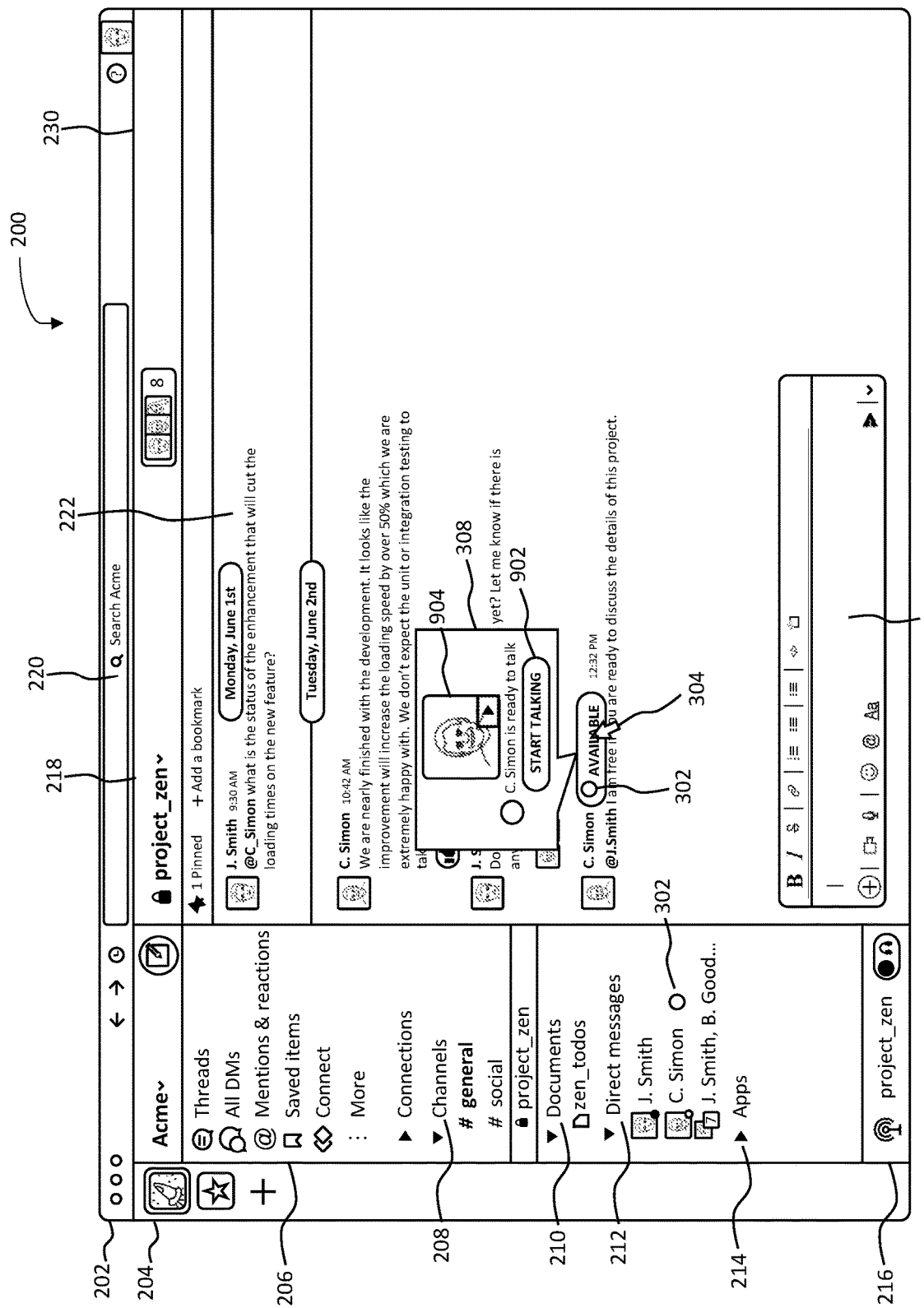
FIG. 9 illustrates a user interface including a user status corresponding to a user availability relating to some aspects of the disclosure.

FIG. 9 illustrates another example of a user interface 200 relating to some aspects of the disclosure. In some such aspects, the user status 302 corresponds to an availability of the first user. For example, an available status may be set for the first user automatically or manually conveying that the first user is available to communicate with others. In some aspects, a button 902 may be included with the user status 302 to initiate a communication session with the first user. For example, in some aspects, a synchronous multimedia collaboration session may be initiated or joined via the button 902.

Additionally, in some aspects of the disclosure, a video status 904 may be included with the user status 302 of the first user. The video status 904 may comprise a pre-recorded video of the first user. For example, the first user may use the video status 904 to verbally describe their current status. Accordingly, the video status 904 may be updated periodically such as daily, weekly, monthly, or may be removed after a predetermined period of time. In some aspects, users may be able to respond or react to the video status 904. For example, in some aspects, additional buttons may be included to respond and react to the video status 904.

In some aspects of the disclosure, a range of varying availability statuses are contemplated. For example, an availability status may be selected from any of available, ready to talk, busy, or away from keyboard, as well as other suitable availability statuses not explicitly described herein. In some aspects, the availability status may be color coded, for example, using a traffic light symbol to convey the user's availability with a green-light symbol representing a user that is available and ready to talk, a yellow-light symbol representing a user that is moderately available and may have limited time to talk or join a communication session, and a red-light symbol representing a user who is not currently available to interact with other users.

In some aspects, the user's availability status may be set manually or automatically. For example, a user's availability status may be inferred based on user information such as user actions recorded in the group-based communication system or within an external application. Further, in some aspects, the user's availability may be determined by reviewing a calendar or schedule of the user. For example, the group-based communication system may interface with a calendaring service (in some cases, via API) to determine the user's availability based on calendar events. Further still, in some aspects, a combination of manual and automatic means are used to set the user's availability status. For example, the status may be determined automatically and then approved, edited, or changed manually by the user.

In one example, a 'water cooler' user status is included for conveying that the user is currently available and seeking out informal communication with other users, such as would occur at a water cooler in a physical office or other common meeting place. Similarly, a 'conference room' user status is contemplated to convey that the user is currently available for formal communication with other users. In some aspects, each of the statuses described above may include interactive buttons for initiating and joining communication sessions or accessing other resources and features within the group-based communication system and external to the group-based communication system. For example, the water cooler user status may include a button operable to join users to a synchronous multimedia collaboration session associated with a social channel and the conference room user status may include a button to join users to a synchronous multi-media collaboration session associated with a specific project channel or a private channel.

In some aspects, a 'need help' user status is contemplated for users who are in need of technical help or other forms of help or support. For example, the 'need help' user status may include a remote desktop button for another user to initiate a remote desktop session to view and/or interact with the user's desktop remotely to provide technical help. Similarly, a standard video communication session may be initiated with a screen sharing functionality such that other users' can view the screen of the user in need of help and guide the user through a technical solution. In some such aspects, the 'need help' user status may be paired with a pre-recorded video of the user describing what they need help with such that other users can view the video prior to offering help. Accordingly, users can determine ahead of time whether they are able to provide the support to the user. Similarly, a textual description describing the user's issue is also contemplated.

Additional user statuses are contemplated such as an 'office hours' user status conveying that a user is currently in a prescheduled availability state. For example, in an education setting, a professor may set their user status as in office hours for a predetermined time during weekdays, such as, 9:00 AM to 5:00 PM Monday through Friday the office hours user status may be presented for the user showing that the professor is currently working on campus and is available to communicate with students. It should be understood that the 'office hours' user status may be used in other settings outside of the education setting described above, for example, a professional such as a real estate agent or a physician may set an 'office hours' user status to convey when the professional is in the office and available to meet and communicate with clients.

In some aspects, user statuses may be associated with physical or virtual locations of the user. For example, the user status may be determined based on the physical location of the user such as whether the user is working from home or in the office or whether the user is out for lunch or on a restroom break. Similarly, the user status may be determined based on a virtual location of the user such as by determining what channel the user is currently viewing or what applications and/or pages that the user is accessing. In some cases, a location user status may be determined in association with a hot desking or rotating office station program. For example, a rotating office station program may include a plurality of stations through which users rotate throughout the day. Accordingly, the user status may reflect what particular station the user is currently at.

Figure 10:
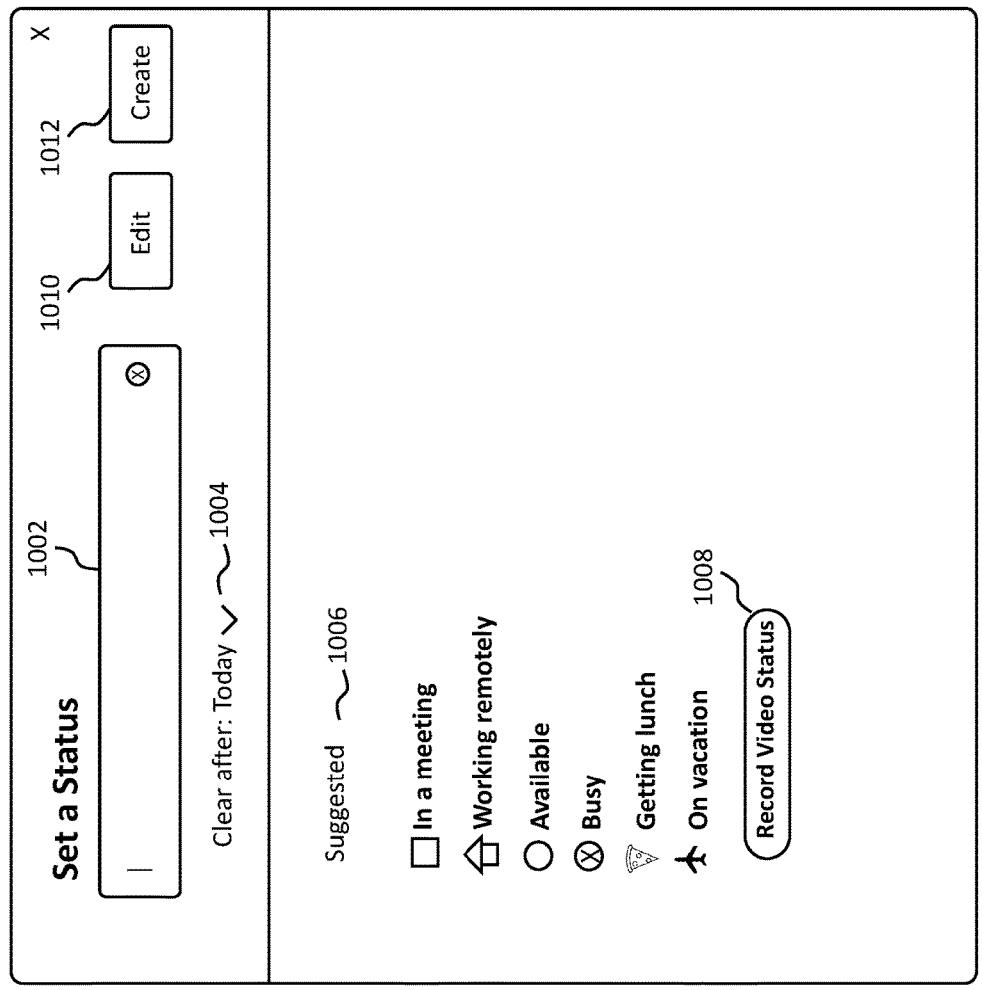
FIG. 10 illustrates a user interface for manually selecting a user status relating to some aspects of the disclosure.

FIG. 10 illustrates one example of a user interface 1000 relating to some aspects of the disclosure. In some such aspects, the user interface 1000 may be included as part of the group-based communication system. For example, a user may navigate to the user interface 1000 from within the user interface 200 to set a user status. The user interface 1000 may comprise an input field 1002 allowing the user to provide textual input to create a custom user status or description relating to the user status. Additionally, a time duration selection 1004 may be included allowing the user to select a time duration for the user status. In some such aspects, the time duration may define a time duration that the user status will persist within the group-based communication system. After expiration of the time duration the user status may be removed, deleted, and/or replaced with another user status. In some aspects, the time duration selection 1004 may be expanded to present a plurality of suggested time durations such as any of an hour, a day, a week, or another time period. Additionally, a custom time period may be defined manually by the user, for example, using the input field 1002.

In some aspects of the disclosure, a list of suggested user statuses 1006 may be included in the user interface 1000. In some cases, a standard list of suggested user statuses may be included that suggests commonly used user statuses to all users. Alternatively, in some such aspects, a personalized list of suggested user statuses may be determined for each individual user based on historical user interactions, such as based on historical data relating to what user statuses that the user or other similar users have used before. Additionally, user statuses may be suggested using more sophisticated means such as utilizing a machine learning model or algorithm trained with historical user interaction and user status data to identify user statuses that are most relevant to an individual user at a given time. For example, the machine learning algorithm may determine that the user is busy based on a typing input of the user and suggest the busy user status to the user or, in some aspects, a busy user status may be automatically assigned to the user based on a determination from the machine learning model.

In some aspects, a record video status option 1008 may be included allowing the user to pre-record a video status such as video status 904, as shown in FIG. 9. For example, the record video status option 1008 may provide access to a video recording feature within the group-based communication system or to an external video recording and editing application integrated into or distinct from the group-based communication system such that the user can record a video status to be included with their user status.

In some aspects, the user interface 1000 further includes an edit option 1010 operable to edit an existing user status and/or a create option 1012 operable to create a new custom user status. The edit option 1010 may allow the user to adjust various parameters relating to the user status. For example, a user may adjust a link or other resource associated with the user status or edit the additional information or description of the user status that are presented when the user status is expanded. In some such aspects, the create option 1012 may allow the user to create a new user status and set parameters for the user status such as what resources and/or features can be accessed by other users through interaction with the user status. Additionally, the user interface 1000 may include other options and settings to be adjusted by the user such as, settings pertaining to how user statuses are displayed and visibility settings for the user status. For example, a user may set a user status to only visible to certain users or to only allow interaction with certain users. Further still, in some aspects, a user may be able to schedule a user status for a future time frame. For example, if a user knows that they will be on vacation in a week the user may preemptively schedule a vacation user status to be assigned while the user is away.

In some aspects of the present disclosure, a user may have multiple user statuses at a given time. Accordingly, a plurality of user statuses may be presented simultaneously. In some such cases, the user statuses may be listed in order of relevancy. For example, an order for the user statuses may be determined based on a predetermined relevancy score assigned to each user status or based on a dynamic relevancy metric which may be personalized to each user and determined algorithmically, for example, using a machine learning model. In other aspects, the user statuses may be cycled through and presented one at a time. In some such cases, the order of the display cycle may correspond to the time that the user statuses were assigned.

Figure 11:
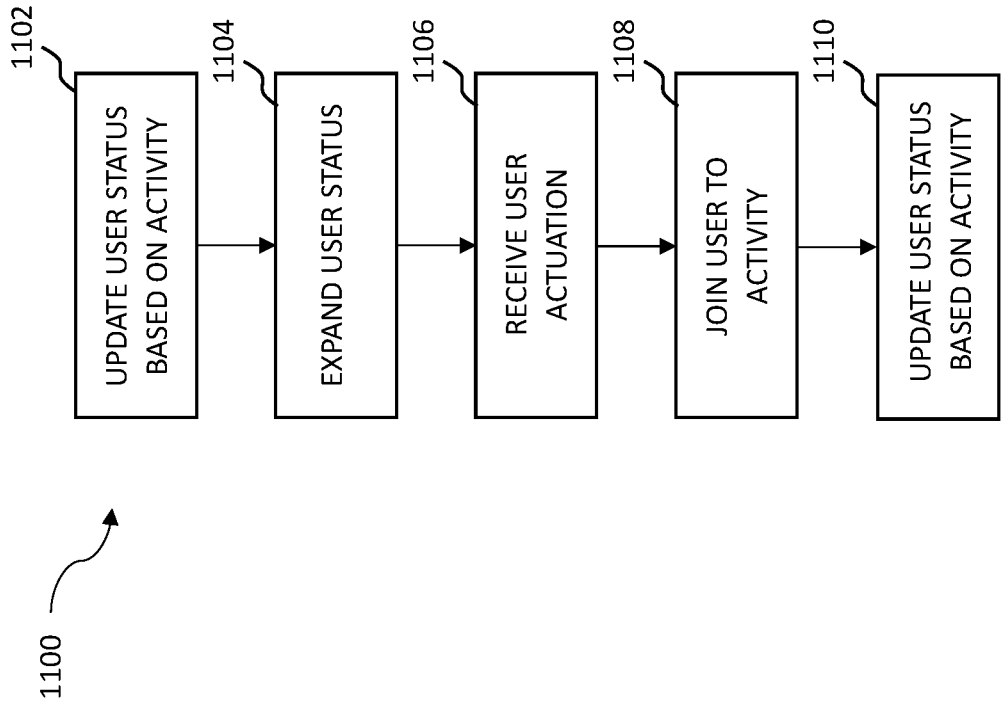
FIG. 11 illustrates a method involving an interactive user status relating to some aspects of the disclosure.

FIG. 11 illustrates one example of a method 1100 relating to some aspects of the disclosure. The method 1100 may be a method of presenting interactive user statuses within the group-based communication system. In some such aspects, the method 1100 may be carried out on one or more processors, such as, for example, the processors of one or more user devices running an instance of the group-based communication system.

At step 1102, a first user status of a first user is updated. The first user status may be updated automatically, for example, based on a first user joining or initiating a collaboration activity, or disconnecting from or stopping the collaboration activity. The collaboration activity may be any of a synchronous multimedia collaboration session, a collaborative document, a meeting, another form of communication session, or another suitable collaborative activity not explicitly described herein. Additionally, or alternatively, in some aspects, the user status may be updated based at least in part on an interaction by the user with one or more resources or features either internal or external to the group-based communication system. For example, the user status may be updated based on a user viewing a video, accessing an image, reading a message, typing a message, using an external application, accessing a web resource, or interacting with various other resources and features not explicitly described herein. Further, in some aspects of the disclosure, the user status may be updated based on user data relating to the user such as the user's birthday, a user's work anniversary, or based on other user data not explicitly described herein.

At step 1104, the first user status is expanded into an expanded first user status and is displayed within a user interface associated with the group-based communication system, such as, for example, user interface 200. In some cases, the first user status may be expanded responsive to a user input of a second user, such as, for example, the second user hovering over the first user status, clicking the first user status, or selecting the first user status in some other way. In some aspects, the expanded first user status includes a join activity control or other form of actuatable control or button operable to allow other users to join or access an activity or resource associated with the user status. For example, the join activity control may comprise a button that, when clicked by the second user, joins the second user to the collaboration activity with the first user. In some aspects, the expanded user status may further comprise additional information corresponding to the collaboration activity or resource associated with the user status.

At step 1106, an actuation of the join activity control is received from the second user. For example, the join activity control may be actuated by the second user clicking on the join activity control or selecting the join activity control in some other way. At step 1108, the second user is joined to the collaboration activity with the first user responsive to receiving actuation of the join activity control from the second user. For example, in the case of a user status associated with a synchronous multimedia collaboration session, the second user may be joined to the synchronous multimedia collaboration session with the first user such that the users are able to collaborate and communicate using multimedia, such as, any of text, audio, video, and other forms of synchronous communication. In the case of a user status associated with a collaborative document, upon actuating the join activity control, the second user receives access to the collaborative document, such that both the first user and the second user are able to simultaneously view and edit the collaborative document.

At step 1110, a second user status of the second user is updated responsive to the second user joining the collaboration activity to reflect that the second user has joined the collaboration activity. Accordingly, in some aspects, the second user status may be expanded to include the join activity control such that other users can join the collaboration activity using the second user status. For example, a third user may join the collaboration activity via the second user status after the second user has been joined to the collaboration activity. It should be understood that, in some aspects, similar steps may be carried out to access resources associated with the user status. For example, a user status associated with one or more resources may be expanded to include an access resource control. The access resource control may comprise a button operable to provide access to the one or more resource for a second user responsive to the second user actuating the button.

In some aspects of the disclosure, additional steps may be performed in addition to the steps described above with respect to the method 1100. For example, a step may be included for further updating the user status for example, based on the first user leaving or disconnecting from the collaboration activity. Here, the user status may be updated to reflect that the first user has disconnected from the collaboration activity. Additionally, it should be understood that, in some aspects, various steps may be performed in a different order than as shown or that certain steps may be carried out simultaneously.

Figure 12:
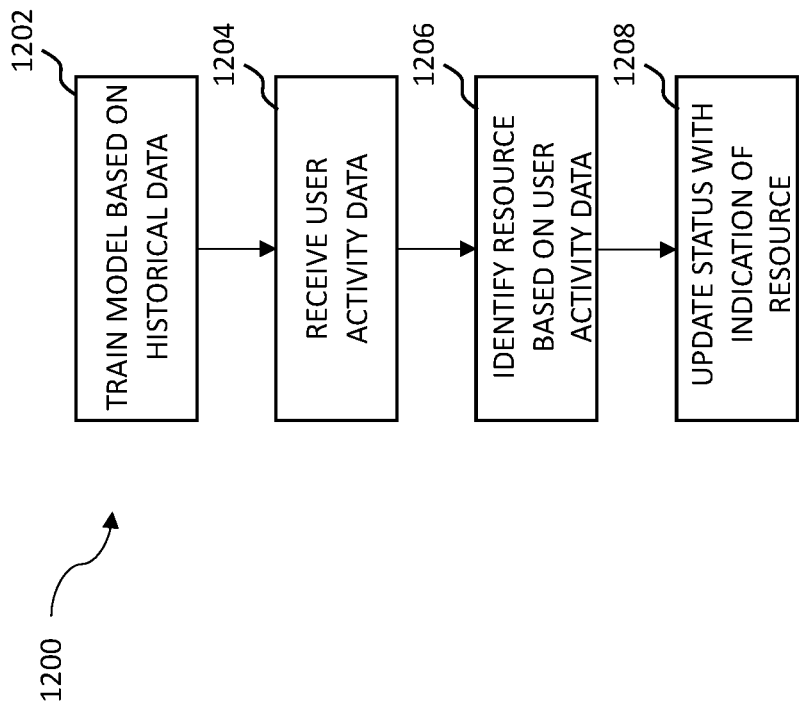
FIG. 12 illustrates a method of training and using a machine learning model relating to some aspects of the disclosure.

FIG. 12 illustrates one example of a method 1200 for training and using a machine learning model relating to some aspects of the disclosure. Similar to as described above with respect to method 1100, the steps of method 1200 may be performed by one or more processors and may be performed in any suitable order.

At step 1202, the machine learning model is trained based on historical data such as any combination of historical user data, user status data, historical user interactions, and other user activity relating to the group-based communication system. Accordingly, the machine learning model may be trained to identify relevant resources to be associated with a given user status. Additionally, the machine learning model may be trained to identify a suitable user status for a user based on the users activity within or outside of the group-based communication system.

At step 1204, user activity data is received. For example, the user activity data may comprise one or more user actions or interactions of a user within the group-based communication system or within an external application distinct from the group-based communication system. In the case of receiving user activity data from an external application the user activity data may be transmitted to the group-based communication system, for example, using an API. In some cases, the user activity data may comprise user actions such as any combination of a user selecting a particular resource, accessing a particular page or environment, or interacting with a particular feature within the group-based communication system.

At step 1206, one or more resources are identified based on the user activity data. In some cases, the one or more resources may be identified using the machine learning model with the user activity data as an input into the machine learning model. Accordingly, the machine learning model identifies one or more relevant resources to be associated with the user status.

At step 1208, a user status of the user is updated. In some cases, the machine learning model may automatically assign or update the user status of the user based on the user activity data and/or one or more identified resources. The user status may be updated to include an indication of the one or more resources and, in some cases, may be updated to include links allowing other users to access the one or more resources through the user status.

Aspects of the disclosure are described above in which one or more resources are automatically identified to be included with the user status, however, it should be understood that one or more resources may be manually added to the user status. For example, while a user is setting or editing their user status, the user may paste a link to a web resource or other resource such that other users are able to access said resources via the user status.

Having thus described various aspects of the present disclosure, what is claimed as new and desired to be protected by Letters Patent includes the following:

1. A method of presenting interactive user statuses in a group-based communication system, the method comprising:
   automatically updating, in a group-based communication user interface of a second user, a display of a first user status of a first user based on a determination that the first user has initiated a collaboration activity,
   wherein the first user status comprises at least one of a graphical icon and text;
   receiving a selection of the first user status by the second user;
   responsive to the selection of the first user status, displaying an expanded first user status of the first user, the expanded first user status of the first user including a join activity control associated with the collaboration activity of the first user;
   responsive to an actuation of the join activity control in the expanded first user status of the first user by the second user, joining the second user to the collaboration activity; and
   responsive to the second user joining the collaboration activity, automatically updating, in the group-based communication system, a second user status of the second user to reflect that the second user has joined the collaboration activity.

2. The method of claim 1, wherein the collaboration activity includes a synchronous multimedia collaboration session including the first user and one or more additional users.

3. The method of claim 2, wherein the synchronous multimedia collaboration session is initiated within an external application distinct from the group-based communication system.

4. The method of claim 1, wherein the collaboration activity includes editing a collaboratively editable document.

5. The method of claim 4, wherein the collaboratively editable document is edited within an external application distinct from the group-based communication system.

6. The method of claim 1, wherein the selection of the first user status is hovering over the first user status by the second user.

7. The method of claim 1, wherein the expanded first user status further includes one or more message suggestions relating to the first user status, the method further comprising:
   receiving, from the second user, a second selection of a selected message suggestion of the one or more message suggestions; and
   responsive to the second selection of one of the one or more message suggestions, automatically generating a message to the first user including content of the selected message suggestion.

8. One or more non-transitory computer-readable media comprising computer-executable instructions that, when executed by at least one processor, perform a method of presenting interactive user statuses in a group-based communication system, the method comprising:
   automatically updating, in a group-based communication user interface of a second user, a display of a first user status of a first user based on a determination that the first user has initiated a collaboration activity,
   wherein the first user status comprises at least one of a graphical icon and text;
   receiving a selection of the first user status by the second user;
   responsive to the selection of the first user status, displaying an expanded first user status of the first user, the expanded first user status of the first user including a join activity control associated with the collaboration activity of the first user; and responsive to an actuation of the join activity control in the expanded first user status of the first user by the second user, joining the second user to the collaboration activity.

9. The one or more non-transitory computer-readable media of claim 8, the method further comprising:
responsive to the second user joining the collaboration activity, automatically updating, in the group-based communication system, a second user status of the second user to reflect that the second user has joined the collaboration activity.

10. The one or more non-transitory computer-readable media of claim 9, the method further comprising:
responsive to a second selection of the second user status of the second user by a third user, displaying an expanded second user status of the second user, the expanded second user status of the second user including the join activity control associated with the collaboration activity of the first user.

11. The one or more non-transitory computer-readable media of claim 8, the method further comprising:
identifying that the first user has disconnected from the collaboration activity; and
responsive to the first user disconnecting from the collaboration activity, automatically updating the first user status and removing the join activity control from the expanded first user status.

12. The one or more non-transitory computer-readable media of claim 8, the method further comprising:
identifying, using a machine learning model trained with historical user interaction data, one or more resources to be included within the expanded first user status of the first user based at least in part on user activity data of the first user; and
updating, within the group-based communication user interface of the second user, the display of the expanded first user status of the first user to include the one or more resources.

13. The one or more non-transitory computer-readable media of claim 8, the method further comprising:
identifying one or more relevant user statuses to be suggested to the first user based on user activity of the first user within the group-based communication system; and
presenting, within the group-based communication user interface, the one or more relevant user statuses to the first user.

14. The one or more non-transitory computer-readable media of claim 8, the method further comprising:
receiving user activity data of the first user via an API associated with an external application; and
automatically updating the first user status based on the user activity data.

15. A system comprising:
at least one processor and one or more non-transitory computer-readable media comprising computer-executable instructions that, when executed by the at least one processor, perform a method of presenting interactive user statuses in a group-based communication system, the method comprising:
automatically updating, in a group-based communication user interface of a second user, a display of a first user status of a first user based on a determination that the first user has initiated a collaboration activity,
wherein the first user status comprises at least one of a graphical icon and text;
receiving a selection of the first user status by the second user;
responsive to the selection of the first user status, displaying an expanded first user status of the first user, the expanded first user status of the first user including a join activity control associated with the collaboration activity of the first user; and
responsive to an actuation of the join activity control in the expanded first user status of the first user by the second user, joining the second user to the collaboration activity.

16. The system of claim 15, wherein the expanded first user status further includes a pre-recorded video status of the first user.

17. The system of claim 16, the method further comprising:
responsive to receiving a video status selection of the pre-recorded video status from the second user, initiating playback of the pre-recorded video status within the group-based communication user interface to the second user.

18. The system of claim 15, wherein the expanded first user status further includes a link to a schedule of the first user, that when selected by the second user, provides access to the schedule of the first user.

19. The system of claim 15, wherein the expanded first user status further includes a preview associated with the collaboration activity.

20. The system of claim 15, wherein the collaboration activity includes a watch party session comprising synchronized playback of a video.

* * * * *